US010103431B2

(12) United States Patent
Swirhun et al.

(10) Patent No.: US 10,103,431 B2
(45) Date of Patent: Oct. 16, 2018

(54) PHASED ARRAY ANTENNA CALIBRATION

(71) Applicant: Google Inc., Mountain View, CA (US)

(72) Inventors: Paul Swirhun, Los Gatos, CA (US); Arnold Feldman, San Francisco, CA (US)

(73) Assignee: Google LLC, Mountain View, CA (US)

( * ) Notice: Subject to any disclaimer, the term of this patent is extended or adjusted under 35 U.S.C. 154(b) by 287 days.

(21) Appl. No.: 15/135,408

(22) Filed: Apr. 21, 2016

(65) Prior Publication Data

US 2017/0310004 A1 Oct. 26, 2017

(51) Int. Cl.

| | |
|---|---|
| ***H01Q 3/26*** | (2006.01) |
| ***G01S 7/40*** | (2006.01) |
| ***H01Q 3/36*** | (2006.01) |
| ***H01Q 3/28*** | (2006.01) |

(52) U.S. Cl.

CPC ............... *H01Q 3/267* (2013.01); *H01Q 3/28* (2013.01); *H01Q 3/36* (2013.01)

(58) Field of Classification Search

CPC ............. H01Q 3/26; H01Q 3/36; H01Q 3/267

USPC ................................ 342/165, 174, 368, 372

See application file for complete search history.

(56) References Cited

U.S. PATENT DOCUMENTS

| | | | |
|---|---|---|---|
| 5,657,023 | A | 8/1997 | Lewis et al. |
| 5,864,317 | A | 1/1999 | Boe et al. |
| 8,957,808 | B2 | 2/2015 | Ookawa |
| 2011/0006949 | A1 | 1/2011 | Webb |

OTHER PUBLICATIONS

"Mutual coupling-based calibration of phased array antennas" Shipley C. et al May 21, 2000 pp. 529-532.

International Search Report and Written Opinion for related Application No. PCT/US2017/025038 dated Jun. 21, 2017.

*Primary Examiner* — Dao L Phan

(74) *Attorney, Agent, or Firm* — Honigman Miller Schwartz and Cohn LLP

(57) ABSTRACT

A method including identifying clusters of antenna elements of a phased array antenna. For each cluster of antenna elements, the method includes identifying a reference antenna element of the cluster of antenna elements and identifying pairs of calibration antenna elements of the cluster of antenna elements. For each pair of calibration antenna elements, the method includes executing a calibration routine configured to determine a calibration adjustment for each antenna element of the pair of calibration antenna elements based on the reference antenna element. The method also includes determining a leveling adjustment for each antenna element of the phased array antenna. The method further includes adjusting the element gain and the element phase of each antenna element of the phased array antenna based on the corresponding leveling adjustment to equalize a transmission gain and a transmission phase of each signal path of the phased array antenna.

26 Claims, 12 Drawing Sheets

| | 1 | 2 | 3 | 4 | 5 | 6 | 7 |
|---|---|---|---|---|---|---|---|
| 7 | Antenna, 122 (1,7,I1) | Antenna, 122 (2,7,H2) | Antenna, 122 (3,7,F2) | Antenna, 122 (4,7,E2) | Antenna, 122 (5,7,F3) | Antenna, 122 (6,7,H3) | Antenna, 122 (7,7,I2) |
| 6 | Antenna, 122 (1,6,H1) | Antenna, 122 (2,6,G1) | Antenna, 122 (3,6,D2) | Antenna, 122 (4,6,C2) | Antenna, 122 (5,6,D3) | Antenna, 122 (6,6,G2) | Antenna, 122 (6,7,H4) |
| 5 | Antenna, 122 (1,5,F1) | Antenna, 122 (2,5,D1) | Antenna, 122 (3,5,B1) | Antenna, 122 (4,5,A2) | Antenna, 122 (5,5,B2) | Antenna, 122 (6,5,D4) | Antenna, 122 (7,5,F4) |
| 4 | Antenna, 122 (1,4,E1) | Antenna, 122 (2,4,C1) | Antenna, 122 (3,4,A1) | Antenna, 122 (4,4,TX) | Antenna, 122 (5,4,A3) | Antenna, 122 (6,4,C3) | Antenna, 122 (7,4,E3) |
| 3 | Antenna, 122 (1,3,F8) | Antenna, 122 (2,3,D8) | Antenna, 122 (3,3,B4) | Antenna, 122 (4,3,A4) | Antenna, 122 (5,3,B3) | Antenna, 122 (6,3,D5) | Antenna, 122 (7,3,F5) |
| 2 | Antenna, 122 (1,2,H8) | Antenna, 122 (2,2,G4) | Antenna, 122 (3,2,D7) | Antenna, 122 (4,2,C4) | Antenna, 122 (5,2,D6) | Antenna, 122 (6,2,G3) | Antenna, 122 (7,2,H5) |
| 1 | Antenna, 122 (1,1,I4) | Antenna, 122 (1,2,H7) | Antenna, 122 (1,3,F7) | Antenna, 122 (1,4,E4) | Antenna, 122 (1,5,F6) | Antenna, 122 (1,6,H6) | Antenna, 122 (1,7,I3) |

FIG. 6A

PHASED ARRAY ANTENNA CALIBRATION

TECHNICAL FIELD

This disclosure relates to calibration of phased array antennas.

BACKGROUND

Electronically steered antennas (ESA), also known as phased array antennas, combine multiple individual transmit/receive (T/R) modules and antennas to create a larger effective aperture. The electronically controlled phase and gain relationship between the individual T/R modules controls the radiation pattern and therefore directivity of the synthesized aperture. This control over the radiation pattern can be used for beam steering in air and space-borne communication systems, for target acquisition and tracking or for the synthesis of deep nulls for clutter suppression in radar or communications systems.

SUMMARY

One aspect of the disclosure provides a method for phased array antenna self-calibration. The method includes identifying clusters of antenna elements of a phased array antenna. The phased array antenna is connected to a manifold configured to route signals between a manifold root and manifold terminals along corresponding signal paths. Each manifold terminal is connected to a respective antenna element of the phased array antenna. The manifold root has a root gain and a root phase. For each cluster of antenna elements, the method includes identifying a reference antenna element of the cluster of antenna elements and identifying pairs of calibration antenna elements of the cluster of antenna elements. Each pair of calibration antenna elements is located equidistantly from the reference antenna element. For each pair of calibration antenna elements, the method includes executing, by data processing hardware, a calibration routine configured to determine a calibration adjustment for each antenna element of the pair of calibration antenna elements based on the reference antenna element. The calibration adjustment includes a gain adjustment to equalize an element gain of the corresponding antenna element to the root gain of the manifold root and a phase adjustment to equalize an element phase of the corresponding antenna element to the root phase of the manifold root. The method also includes determining, by the data processing hardware, a leveling adjustment for each antenna element of the phased array antenna. The leveling adjustment includes a gain-code and a phase-code based on an optimization of the calibration adjustment for the corresponding antenna element within the corresponding clusters of antenna elements. The method further includes adjusting, by the data processing hardware, the element gain and the element phase of each antenna element of the phased array antenna based on the corresponding leveling adjustment to equalize a transmission gain and a transmission phase of each signal path of the phased array antenna.

Implementations of the disclosure may include one or more of the following optional features. In some implementations, each gain adjustment includes a deviation in the gain-code from a nominal gain value and each phase adjustment includes a deviation in the phase-code from a nominal phase value. Determining the leveling adjustment for each antenna element may include populating, by the data processing hardware, a gain adjustment matrix with the gain adjustments and populating, by the data processing hardware, a phase adjustment matrix with the phase adjustments. Each adjustment matrix may include columns and rows, each column corresponding to an antenna element and each row corresponding to a cluster of antenna elements. For each adjustment matrix, the method may include: adding, by the data processing hardware, a shift matrix to the adjustment matrix, the shift matrix aligning adjustments by antenna element; averaging, by the data processing hardware, the adjustments of each column of the adjustment matrix; and rounding each averaged adjustment to a nearest integer, the nearest integer being the corresponding gain-code or phase-code. In some examples, for each adjustment matrix, the method includes minimizing a variance of each column subject to a constraint that relative offsets in a given row are maintained. Each row of each adjustment matrix may correspond to a least-squares fitting of the corresponding adjustments of the corresponding cluster of the antenna elements. The clusters of antenna elements may overlap.

In some implementations, the reference antenna element is a transmitter antenna element and the pairs of calibration antenna elements are pairs of receiver antenna elements. The calibration routine may include, for each pair of receiver antenna elements, transmitting a reference signal from the transmitter antenna element and receiving the reference signal at the receiver antenna elements. The received reference signal at each receiver antenna element may have a corresponding receive gain and a corresponding receive phase. The method also includes determining, by data processing hardware, the gain adjustments to equalize the respective element gains of each receiver antenna element to the root gain of the manifold root based on the receive gains and determining, by the data processing hardware, the phase adjustments to equalize the respective element phases of each receiver antenna element to the root phase of the manifold root based on the receive phases.

The method may further include summing the received reference signals of the pair of receiver antenna elements, receiving the summed signal in a peak detector, and adjusting the element phase and/or the element gain of each receiver antenna element of the pair of receiver antenna elements based on an output of the peak detector. The method may also include adjusting the element phase of one of the receiver antenna elements of the pair of receiver elements so that the output of the peak detector is maximized. In some examples, the method includes shifting the element phase of one of the receiver antenna elements of the pair of receiver elements by 180 degrees and adjusting the element gain of the other of the receiver antenna elements of the pair of receiver elements so that the output of the peak detector is minimized.

In some implementations, the reference antenna element is a receiver antenna element and the pairs of calibration antenna elements are pairs of transmitter antenna elements. The calibration routine may include, for each pair of transmitter antenna elements, transmitting a reference signal from each transmitter antenna element of the pair of transmitter antenna elements and receiving the reference signals at the receiver antenna element. Each received reference signal at the receiver antenna element may have a corresponding receive gain and a corresponding receive phase. The method may also include determining, by data processing hardware, the gain adjustments to equalize the respective element gains of each transmitter antenna element to the root gain of the manifold root based on the receive gains, and determining, by the data processing hardware, the phase adjustments to equalize the respective element phases of each transmitter antenna element to the root phase of the manifold root based on the receive phases. The method may also include summing the received reference signals of the receiver antenna element, receiving the summed signal in a peak detector, and adjusting the element phase and/or the element gain of each transmitter antenna element of the pair of transmitter antenna elements based on an output of the peak detector. The method may also include adjusting the element phase of one of the transmitter antenna elements of the pair of transmitter elements so that the output of the peak detector is maximized. In some examples, the method includes shifting the element phase of one of the transmitter antenna elements of the pair of transmitter elements by 180 degrees, and adjusting the element gain of the other of the transmitter antenna elements of the pair of transmitter elements so that the output of the peak detector is minimized.

Another aspect of the disclosure provides an antenna system. The system includes a phased array antenna having antenna elements, a manifold connected to the phased array antenna, and a calibration module in communication with the manifold and the phased array antenna. The manifold has a manifold root and manifold terminals. The manifold is configured to route signals between the manifold root and the manifold terminals along corresponding signal paths. Each manifold terminal is connected to a respective antenna element of the phased array antenna. The manifold root has a root gain and a root phase. The calibration module is configured to perform operations. The operations include identifying clusters of antenna elements of the phased array antenna and determining a leveling adjustment for each antenna element of the phased array antenna. The leveling adjustment includes a gain-code and a phase-code based on an optimization of the calibration adjustment for the corresponding antenna element within the corresponding clusters of antenna elements. The operations further include adjusting the element gain and the element phase of each antenna element of the phased array antenna based on the corresponding leveling adjustment. For each cluster of antenna elements, the operations include identifying a reference antenna element of the cluster of antenna elements and identifying pairs of calibration antenna elements of the cluster of antenna elements. Each pair of calibration antenna elements is located equidistantly from the reference antenna element. For each pair of calibration antenna elements, the operations include executing a calibration routine configured to determine a calibration adjustment for each antenna element of the pair of calibration antenna elements based on the reference antenna element. The calibration adjustment includes a gain adjustment to equalize an element gain of the corresponding antenna element to the root gain of the manifold root and a phase adjustment to equalize an element phase of the corresponding antenna element to the root phase of the manifold root.

Implementations of the disclosure may include one or more of the following optional features. In some implementations, each gain adjustment includes a deviation in the gain-code from a nominal gain value and each phase adjustment includes a deviation in the phase-code form a nominal phase value. Determining the leveling adjustment for each antenna element includes populating, by the data processing hardware, a gain adjustment matrix with the gain adjustments and populating, by the data processing hardware, a phase adjustment matrix with the phase adjustments. Each adjustment matrix includes columns and rows, each column corresponding to an antenna element and each row corresponding to a cluster of antenna elements. For each adjustment matrix, the system may include: adding, by the data processing hardware, a shift matrix to the adjustment matrix, the shift matrix aligning adjustments by antenna element; averaging, by the data processing hardware, the adjustments of each column of the adjustment matrix; and rounding each averaged adjustment to a nearest integer. The nearest integer is the corresponding gain-code or phase-code. Determining the leveling adjustment for each antenna element may also include, for each adjustment matrix, minimizing a variance of each column subject to a constraint that relative offsets in a given row are maintained. Each row of each adjustment matrix may correspond to a least-squares fitting of the corresponding adjustments of the corresponding cluster of the antenna elements. The clusters of antenna elements may overlap.

In some implementations, the reference antenna element is a transmitter antenna element and the pairs of calibration antenna elements are pairs of receiver antenna elements. The calibration routine may include, for each pair of receiver antenna elements: transmitting a reference signal from the transmitter antenna element; receiving the reference signal at the receiver antenna elements; determining the gain adjustments to equalize the respective element gains of each receiver antenna element to the root gain of the manifold root based on the receive gains; and determining the phase adjustments to equalize the respective element phases of each receiver antenna element to the root phase of the manifold root based on the receive phases. The received reference signal at each receiver antenna element may have a corresponding receive gain and a corresponding receive phase. In some examples, the calibration routine includes summing the received reference signals of the pair of receiver antenna elements, receiving the summed signal in a peak detector, and adjusting the element phase and/or the element gain of each receiver antenna element of the pair of receiver antenna elements based on an output of the peak detector. The calibration routine may also include adjusting the element phase of one of the receiver antenna elements of the pair of receiver elements so that the output of the peak detector is maximized. The calibration routine may further include shifting the element phase of one of the receiver antenna elements of the pair of receiver elements by 180 degrees and adjusting the element gain of the other of the receiver antenna elements of the pair of receiver elements so that the output of the peak detector is minimized.

In some examples, the reference antenna element is a receiver antenna element and the pairs of calibration antenna elements are pairs of transmitter antenna elements. The calibration routine may include, for each pair of transmitter antenna elements: transmitting a reference signal from each transmitter antenna element of the pair of transmitter antenna elements; receiving the reference signals at the receiver antenna element; determining the gain adjustments to equalize the respective element gains of each transmitter antenna element to the root gain of the manifold root based on the receive gains; and determining the phase adjustments to equalize the respective element phases of each transmitter antenna element to the root phase of the manifold root based on the receive phases. Each received reference signal at the receiver antenna element may have a corresponding receive gain and a corresponding receive phase. The calibration routine may include summing the received reference signals of the receiver antenna element, receiving the summed signal in a peak detector, and adjusting the element phase and/or the element gain of each transmitter antenna element of the pair of transmitter antenna elements based on an output of the peak detector. The calibration routine may also include adjusting the element phase of one of the transmitter antenna elements of the pair of transmitter elements so that the output of the peak detector is maximized. The calibration routine may further include shifting the element phase of one of the transmitter antenna elements of the pair of transmitter elements by 180 degrees and adjusting the element gain of the other of the transmitter antenna elements of the pair of transmitter elements so that the output of the peak detector is minimized.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 6A is a schematic view of another example antenna layout of a phased array antenna showing clusters.

Like reference symbols in the various drawings indicate like elements.

DETAILED DESCRIPTION

In radio transmission systems, an array of antennas can be used to increase the ability to communicate at greater range and/or increase antenna gain in a direction compared to using fewer elements. In a phased array antenna, the phase of individual elements may be adjusted to shape the area of coverage, resulting in longer transmissions or steering the transmission direction electronically without physically moving the array. The shape of the coverage may be adjusted by the alteration of individual elements transmission phase and gain in the array. Variations in the individual elements transmission phase and gain reduce the efficiency of the antenna, and may reduce the communication data speed or transmission range of a communications system employing a phased array. Traditionally, the individual elements phase and gain may be calibrated using a complex and expensive laboratory test. This disclosure presents a method for field calibrating the array without the need for a laboratory and optimizes the phase and gain for each element by comparing to measurements taken during a self-testing procedure.

System Overview

Figure 1:
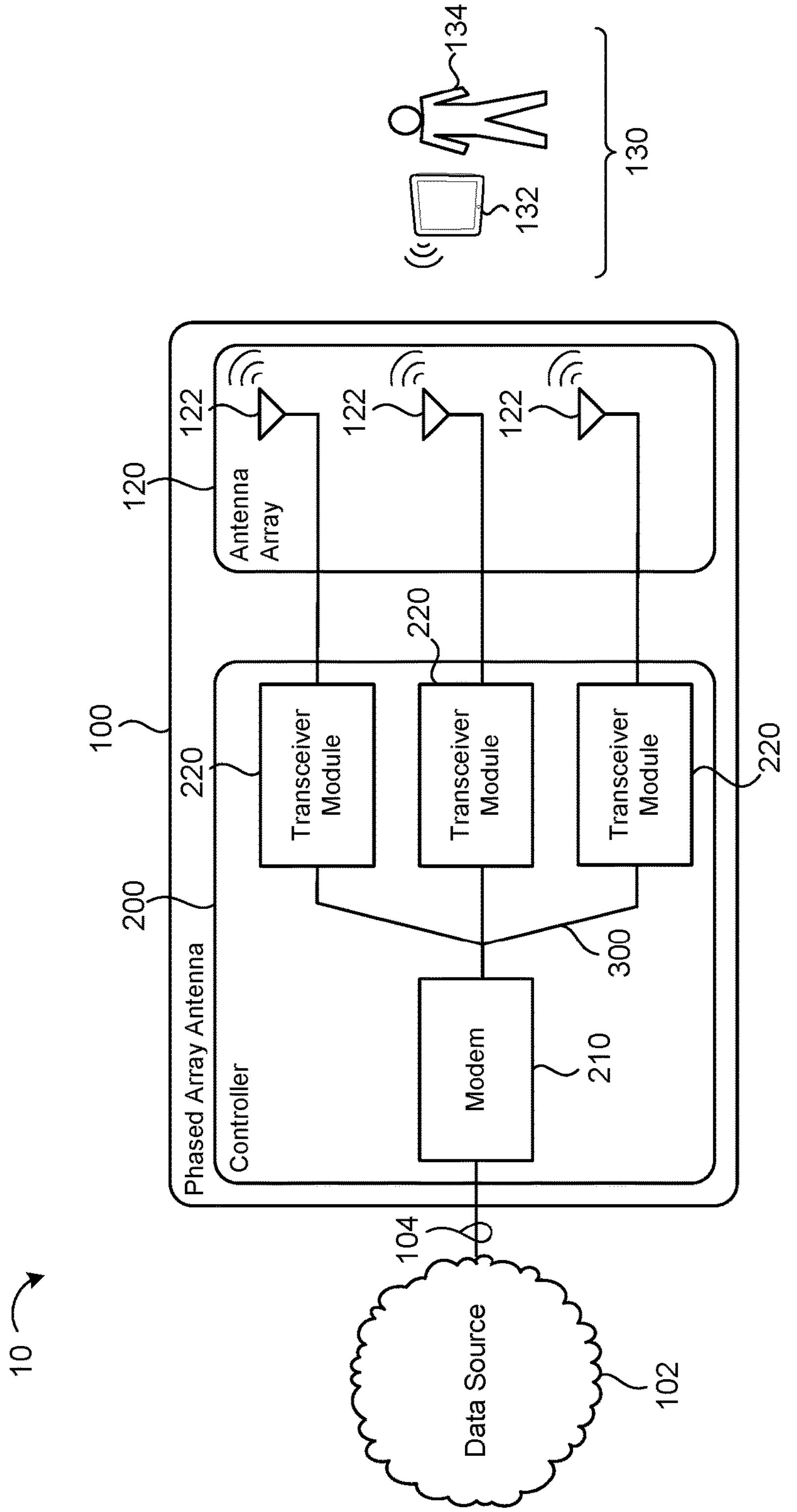
FIG. 1 is a schematic view of an example architecture of a phased array antenna system.

FIG. 1 provides a schematic view of an example phased array antenna system 10. The phased array antenna system 10 includes a phased array antenna 100 in communication with a data source 102 and a remote system 130. In the example shown, the phased array antenna 100 includes a controller 200 in communication with an antenna array 120 composed of a plurality of antenna elements 122. The controller 200 includes a modem 210 in communication with a plurality of transceiver modules 220. The modem 210 receives data 104 from the data source 102 and converts the data 104 into a form suitable to be transmitted to the antenna array 120. For example, the modem 210 converts the data 104 to a signal for transmission or receipt by the transceiver module 220 via electromagnetic energy or radio signals. The antenna array 120 may transmit the electromagnetic energy over the air for receipt by the remote systems 130. In some examples, the remote system may include aircraft, moving vehicles, terrestrial base stations, mobile devices, and/or user devices. The remote systems 130 may include a transceiver device 132 associated with a user 134. The phased array antenna system 10 can also operate in the reverse order, with the remote system 130 transmitting electromagnetic energy to the antenna array 120, which the controller 200 converts to data 104. The remote system 132 may include a phased array antenna 100.

Figure 2:
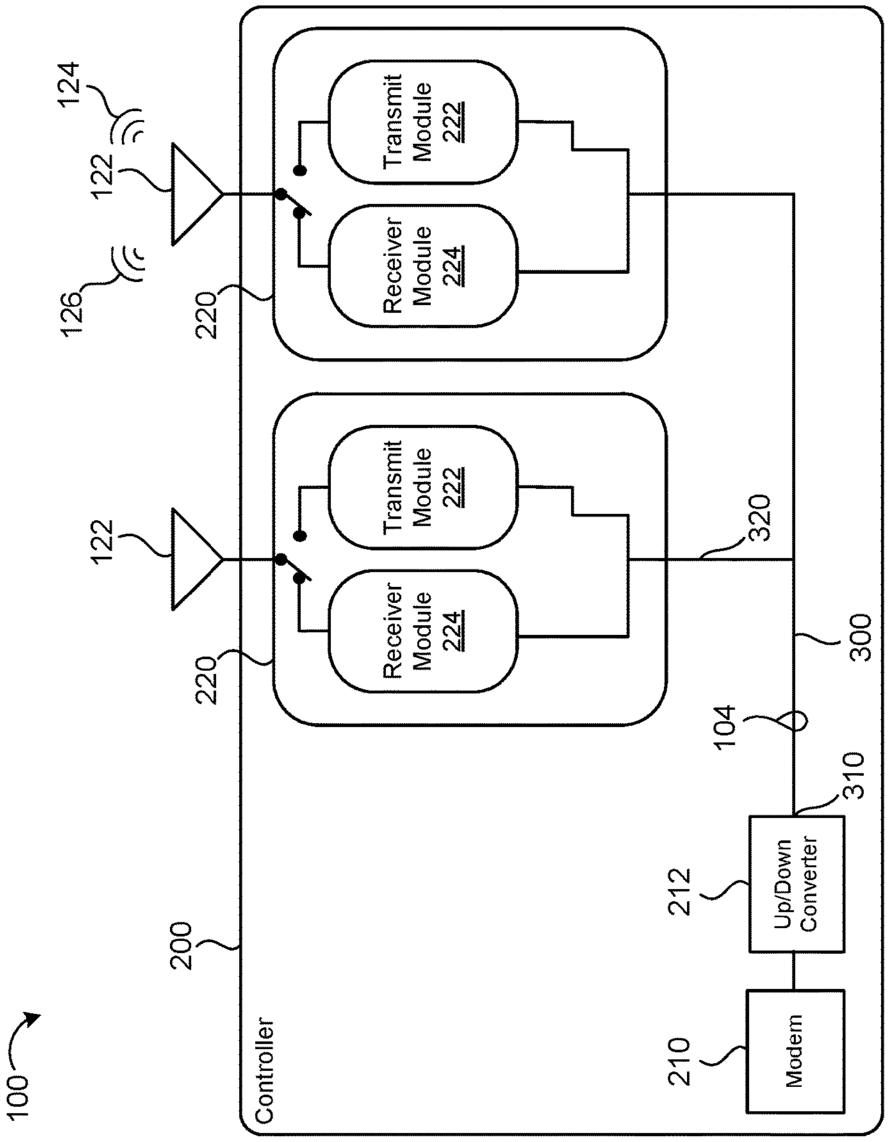
FIG. 2 is a schematic view of an example phased array antenna.

FIG. 2 provides a schematic view of an example phased array antenna 100 including a controller 200, which includes a modem 210 to receive data 104. The data 104 may be transferred by the modem 210 to an up down converter 212. The up/down converter 212 converts signals containing communication information from the modem 210 into a form which can be used by the transceiver modules 220. The up down converter 212 sends the signal via a manifold 300 to at least one or more transceiver modules 220, which send or receive the signal via the corresponding antenna element 122. The phased array antenna 100 may use the manifold 300 in both directions (transmit and receive) or have two manifolds 300—one for transmit functionality and one for receive functionality. When the manifold 300 operates in both transmit and receive modes and when the phased antenna array 100 is operated in receive mode, the manifold 300 combines signals received by multiple transceivers 220 at each manifold terminal 320 into fewer signals input to the up/down converter 212 at the manifold root 310. When the manifold 300 operates in both transmit and receive modes and when the phased antenna array 100 is operated in transmit mode, the manifold 300 splits signal(s) output by the up/down converter 212 at the manifold root 310 into a plurality of signals output by the manifold terminals 320, one signal corresponding to each transceiver module 220.

The manifold 300 may include a manifold terminal 320 connecting to one or more transceiver 220. One or more of the manifold terminals 320 may combine to form a manifold root 310. The combination of the manifold root 310 and the manifold terminals 320 may form the manifold 300 to transmit data to the transceivers 220. The phased array antenna 100 includes the combination of the plurality of the antenna element 122 and the transceiver modules 220. A transmit module 222 and receiver module 224 may be contained within the transceiver module 220, which can be connected to the antenna element 122 depending on if the transceiver is required to transmit or receive. Each antenna element 122 transmits electromagnetic energy with a phase 124 and a gain 126. The gain 126 may be representative of the power or peak magnitude of the electromagnetic wave. The phase 124 may be representative of a narrowband time-delay of the electromagnetic signal wave in relation to an arbitrary reference time. The gain 126 and the phase 124 of a transmitted electromagnetic wave may be measured in comparison to a signal at the root manifold 310. For example, the phase 124 may be considered relative to an arbitrary reference point at the root manifold 310. In at least one example, there are three manifold terminals 320, a first manifold terminal 320, 320*a* connected to a first transceiver 220, 220*a*, a second manifold terminal 320, 320*b* connected to a second transceiver 220, 220*b*, and a third manifold terminal 320, 320*c* connected to a third transceiver 220, 220*c*, all of which are connected to the manifold root 310.

Antenna Calibration

Figure 3:
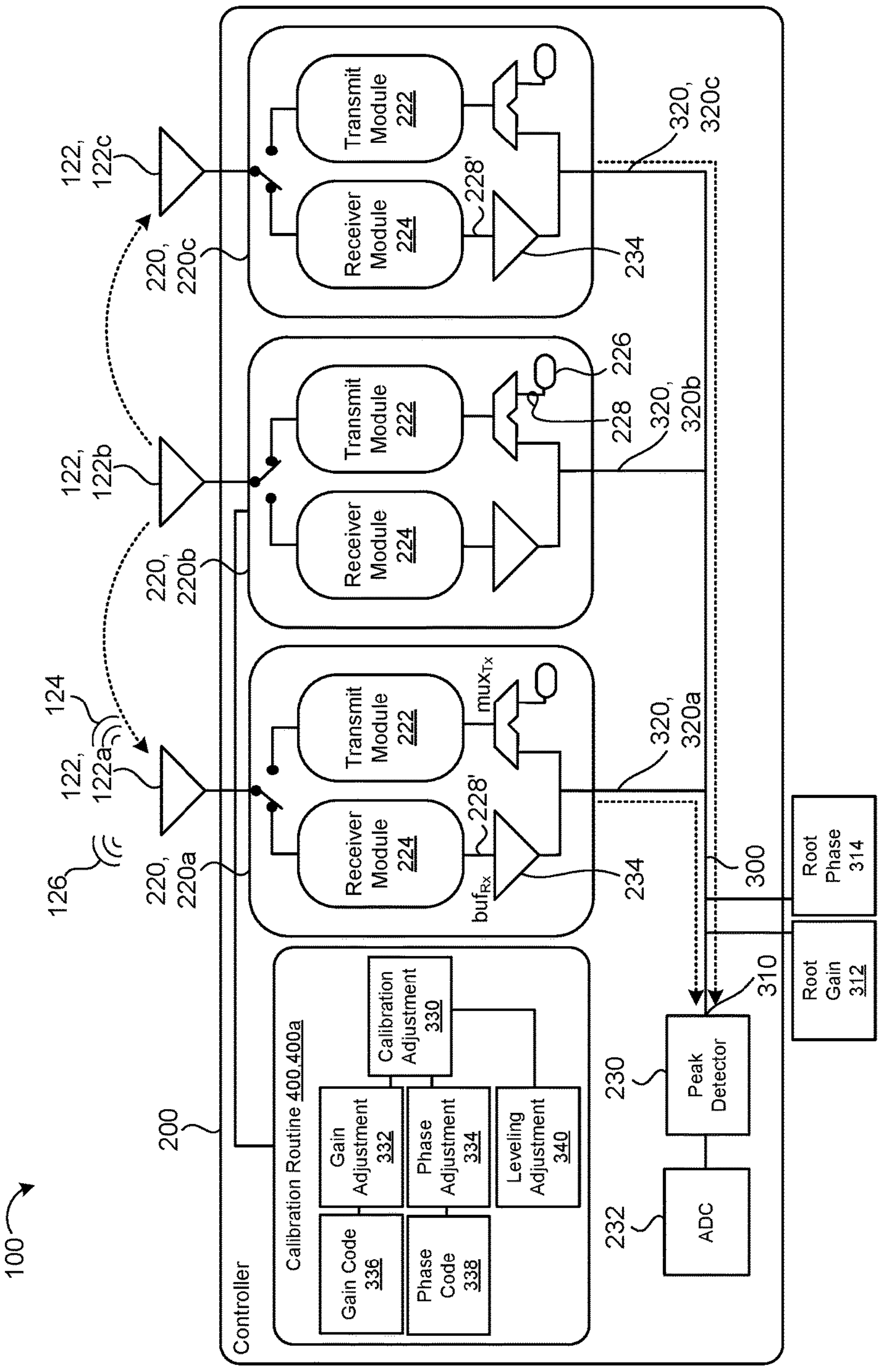
FIG. 3 is a schematic view of an example phased array antenna configured for calibrating receivers in the phased array antenna.

FIG. 3 provides a schematic view of an example phased array antenna 100 including a plurality of transceiver modules 220, 220*a* . . . 220*c* configured to calibrate the received phase 124 and gain 126 of one antenna element 122 in the phased array antenna 100. Each transceiver module 220 includes a signal generator 226 connected to the transmit module 224. The signal generator 226 may be any system that can provide an appropriate signal for the transmit module 224, such as a phased-locked loop (PLL) 226. For the purposes of this application, the examples within the signal generator 226 will be referred to as a phased-locked loop (PLL) 226. The PLL 226 may be capable of generating a constant frequency output to be used for calibration and to output a reference signal 228 in order to provide measurements of phase 124. The manifold 300 may connect each of the transceiver modules 220 to a peak detector 230. At the manifold root 310, the signal contained within the manifold 300 from the transceivers 220 may include a root gain 312 and a root phase 314, both of which have arbitrary reference levels. The reference point may be taken to be the signal level 126 and the phase 124 of the transmitted signal from the second antenna element 122*b*. The transmitted signal from the second antenna element 122, 122*b* may be received with a substantially similar signal level and phase by the first antenna elements 122, 122*a* and the third antenna element 122, 122*c*, because the first antenna elements 122, 122*a* and the third antenna element 122, 122*c* may be selected to be part of a cluster 128 of antenna elements 122 arranged equidistantly from the second antenna element 122, 122*b*. The peak detector 230 may be connected to an analog to digital converter (ADC) 232. A signal level detector, such as the peak detector 230, may be implemented in various ways. One example of a peak detector 230 may be a diode and a capacitor connected in series to output a DC voltage representative of a maximum peak of an applied alternating current signal or carrier wave. The DC voltage output by the peak detector 230 may be converted by the ADC 232 to provide a signal to a computer to determine the current peak voltage being output by a signal. The transceiver 220 may adjust the phase 124 and the gain 126 of its respective antenna element 122 as part of a calibration adjustment 330. The calibration adjustment 330 may include a gain adjustment 332 and a phase adjustment 334 related to the gain 126 and the phase 124, respectively. The gain adjustment 332 may include a gain code 336, which may be a value related to the amount of gain adjustment 332 implemented by the transceiver 220. The phase adjustment 334 may include a phase code 338, which may be a value related to the amount of phase adjustment 334 implemented by the transceiver 220. The calibration adjustment 330 may be related to a leveling adjustment 340. The leveling adjustment 340 may be an adjustment to equalize and/or minimize discrepancies in phase 124 and gain 126 across the antenna elements 122 of the phased antenna array 120. An antenna element 122 connected to a transmit module 222 in a transceiver 220 may be considered a transmit antenna element 122 (also referred to as a transmitter antenna element 122). An antenna element 122 connected to a receiver module 224 in a transceiver 220 may be considered a receive antenna element 122 (also referred to as a receiver antenna element 122).

In some examples, a calibration routine 400, 400*a* for calibrating the phase 124 of the phased array antenna 100 includes selecting a first transceiver 220, 220*a* and a corresponding first antenna element 122, 122*a* as a reference antenna 122 having a corresponding phase 124 and a corresponding gain 126. The first antenna element 122, 122*a* may be a certain distance from a second antenna element 122, 122*b*. The calibration routine 400*a* also includes selecting a third transceiver 220, 220*c* and a corresponding third antenna element 122, 122*c*, where the signal paths through transceiver modules 220, 220*a*, 220*b* to the root of the manifold 310 will be equalized in gain 126 and phase 124. That is, the gain 126 and the phase 124 of two receive antenna elements 122, 122*a*, 122*b* will be equalized relative to one another. The first and third antenna elements 122, 122*a*, 122*c* are connected to the first and third transceiver modules 220, 220*a*, 220*c*, respectively, and are located an equal distance away from the second antenna element 122, 122*b*, which may be connected to the second transceiver module 220, 220*b*, and therefore have similar levels of electromagnetic coupling to the second antenna element 122, 122*b*, relative to one another. The second transceiver module 220, 220*b* may be configured to a transmit mode. The PLL 226 of the second transceiver module 220, 220*b* may feed a radio frequency signal to the attached antenna element 122, 122*b* to be used in the calibration. Both the first and third transceiver modules 220, 220*a*, 220*c* output the received signal broadcast from the second transceiver module 220, 220*b* to the manifold 300. The greater the difference in phase 124 of the signal received by the first transceiver module 220, 220*a* compared to the third transceiver module 220, 220*c*, the greater the cancellation of the signal, resulting in a lower amplitude signal to the peak detector 230 connected to the manifold root 320 and measuring the root gain 312 and root phase 314. The calibration routine 400*a* may be executed by adjusting the phase 124 output of the third transceiver module 220, 220*c* and/or the phase of the first transceiver module 220, 220*a* until the maximum signal may be received on the manifold 300. The phase 124 may be adjusted by altering the calibration adjustment 330 and changing the phase code 338, which alters the phase adjustment 334 implemented by the receiver modules 224 in each receiving transceiver module 220, 220*a*, 220*c*. The maximum signal correlates to the highest peak voltage of the signal and therefore the peak detector 230 outputs a maximum signal level or voltage to the ADC 232. When the signal output from the peak detector 230 is at a maximum, the two signals being received by the first and third transceiver modules 220, 220*a*, 220*c* are closest in matching phase 124 to the signal being transmitted by the second transceiver module 220, 220*b*, signaling optimal phase alignment of the phases 124 of the signal paths through transceiver modules 220, 220*a*, 220*c* to the manifold root 310 of the manifold 300

Upon completion of the first calibration of the phase 124, the calibration routine 400*a* includes calibrating the gain 126 of the phased array antenna 100 by adjusting the phase 124 received by the first transceiver module 220, 220*a* to be 180 degrees from its original configuration. The gain 126 may be adjusted by adjusting the calibration adjustment 330 by altering the gain code 336, which alters the gain adjustment 332 of the receiving transceiver modules 220, 220*a*, 220*b*. The calibration routine 400*a* may include adjusting the gain 126 or amplitude of the output signal of the first and/or third transceiver modules 220, 220*a*, 220*c* until the output of the peak detector 230 is minimized. The peak detector 230 may read the signal level (e.g. the root gain 312 and/or the root phase 314) of the manifold root 310. A complete cancellation of signals occurs when two received signals are perfectly 180 degrees out of phase from each other and are of equal amplitude. In the event that one of the signals has higher amplitude than the other signal, a residual part of the signal was not cancelled, allowing the peak detector 230 to show an output not equal to zero. To complete the calibration of the first transceiver module 220, 220*a* and third transceiver module 220, 220*c* and the corresponding first antenna element 122, 122*a* and third antenna element 122, 122*c* the calibration routine 400*a* includes adjusting the gain 126 of the signal to minimize the output of the peak detector 230 during the time that the first transceiver module 220, 220*a* is outputting a 180 degree reverse phase signal relative to the phase signal output by the third transceiver module 220, 220*c*. The gain 126 may be adjusted by adjusting the calibration adjustment 330, for example, by altering the gain code 336, which may alter the gain adjustment 332 of the antenna 122. The calibration routine 400*a* for the receiver modules 224 described above may be repeated across a plurality of antenna element 122 and transceiver modules 220 to ensure that the received signal of each of transceiver module 220 within an equidistant cluster surrounding a transmitting transceiver module 220 all exhibit the same signal level (e.g. gain 312) and phase 314 relative to one another, as measured by the peak detector 230 at the manifold root 310 of the manifold 300.

Figure 4:
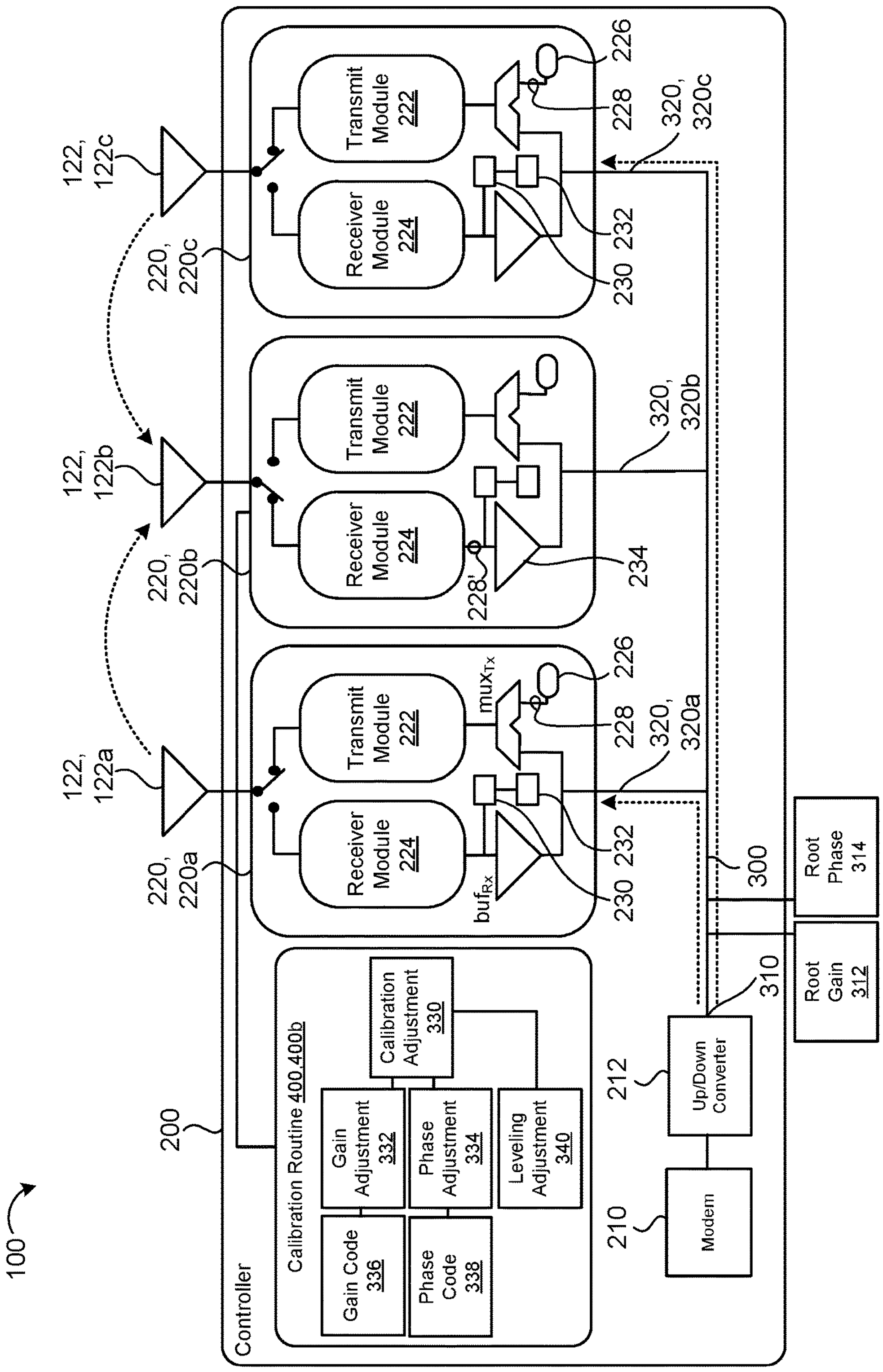
FIG. 4 is a schematic view of an example phased array antenna configured for calibrating transmitters in the phased array antenna.

FIG. 4 provides a schematic view of an example phased array antenna 100 that includes a plurality of transceiver modules 220, 220*a* . . . 220*c* that may be used to calibrate the transmitted phase 124 and gain 126 of an antenna element 122 in the phased array antenna 100. In some examples, the peak detector 230 and the ADC 232 are located within the transceiver module 220. This provides a simpler system than switching hardware to change the manifold 300 from the up down converter 212 and modem 210 to the peak detector 230 and the ADC 232. In some examples, another calibration routine 400, 400*b* for calibrating a transmitter pair within the phased array antenna 100 includes selecting a first antenna element 122, 122*a* and a first transceiver module 220, 220*a* as a reference antenna element 122 to participate in the calibration routine 400, 400*b* and configuring them for a transmission. The calibration routine 400*b* also includes selecting a second antenna element 122, 122*b* and a second transceiver module 220, 220*b* as a receiving monitor for the calibration and configuring them in a receiving configuration. The calibration routine 400*b* includes identifying a third antenna element 122, 122*c* and a third transceiver module 220, 220*c* to participate in the calibration routine 400, 400*b* The calibration routine 400, 400*b* may attempt to equalize the gain 126 and the phase 124 of the two transmitted signals outputted by the first transceiver module 220, 220*a* and the third transceiver module 220, 220*c*, where each signal path begins at the manifold root 310 of the manifold 300 and concludes anywhere along the shared reception path of the manifold 300 in the receive transceiver module 220, 220*b*. The first and third transceiver modules 220, 220*a*, 220*c* both output a common reference signal 228 from the up/down converter 212 and transmit it through their respective antenna elements 122, 122*a*, 122*c*. In some examples, the common reference signal 228 is generated by the PLL 226. As both the first and third antenna elements 122, 122*a*, 122*c* are the same distance physically away from the receiving second antenna element 122, 122*b*, a similar level of coupling may occur along each of the respective signal paths of the antenna elements 122, 122*a*, 122*b*, 122*c*. Due to the coupling, the phase 124 and gain 126 of the signal transmitted from the first antenna element 122, 122*a* may arrive at the same time and with some interference similar to the signal transmitted from third antenna element 122,122*c*. The signal transmitted from the first antenna element 122, 122*a* and the third antenna element 122, 122*c* may arrive at the receiving second antenna element 122, 122*b* at substantially the same time. As the signals emanating from the first and third antenna elements 122, 122*a*, 122*c* interfere with each other, any difference in phase 124 may affect the combined received signal as measured by the peak detector 230 and the ADC 232 in the second transceiver module 220, 220*b*. In some examples, any difference in phase 124 of the combined received signal may cancel the other signal. While both the first and third antenna elements 122, 122*a*, 122*c* are transmitting, the calibration routine 400*b* includes adjusting the phases 124 of the first and/or third transceiver modules 220, 220*a*, 220*c*. As with before, when the phase 124 of each of the two signals are in closest alignment, there may be the least amount of cancellation between the two signals, allowing for the peak detector 230 located within the second transceiver 220, 220*b* to produce the maximum signal output, which it applies to the ADC 232 in the second transceiver module 220, 220*b*. The phase 124 of signals traveling through the first and third transceiver modules 220, 220*a*, 220*c* may be adjusted by altering the calibration adjustment 330. The phase code 338 of the calibration adjustment 330 may alter the phase adjustment 334, which adjusts the phase 124 of the signal radiated by the calibration antennas elements 122, 122*a*, 122*c*. After the first and third transceiver modules 220, 220*a*, 220*c* have been adjusted to have equal phase 124 at the reference transceiver 220, 220*b* (or receive module 224 of the second transceiver 220, 220*b*), the first and third transceivers 220, 220*a*, 220*c* may then be adjusted to equalize their relative gain 126, so that their signal level contributions are equal at the peak detector 230 in the receive antenna element 122, 122*b*. The calibration routine 400*b* may include adjusting the phase 124 of the signal from the first transceiver 220, 220*a* to be 180 degrees from its previous output. Adjusting the phase 124 by 180 degrees may be accomplished by adjusting the phase code 338 or the phase adjustment 334. This results in the signal from the third transceiver 220, 220*c* canceling out the signal from the first transceiver 220, 220*a* as received by the second transceiver 220, 220*b*. The calibration routine 400*b* includes adjusting the gain 126 of the first and third transceiver modules 220, 220*a*, 220*c* so that the peak detector 230 contained within the second transceiver 220, 220*b* has a minimum output. The gain 126 may be adjusted as part of the calibration adjustment 330. The calibration adjustment 330 may alter the gain adjustment 332 by altering the gain code 336, thus changing the gain 126 of the antenna element 122. The minimum output results in the closest matching gain 126 between the first transceiver module 220, 220*a* and the third transceiver module 220, 220*c*. The calibration routine 400*b* for transmitters may be repeated across a plurality of antenna elements 122 and transceiver modules 220 to ensure that the output of each of the transceivers modules 220 matches the reference transceiver module 220, 220*a*. In some implementations, the transceiver module 220 includes a summer 234 configured to sum the reference signal 228' from the PLL 226 and the output of the receiver module 224 and output the sum to the manifold 300. The reference signal 228' may be the signal received from the antenna element 122 and processed by the receiver module 224.

Figure 5:
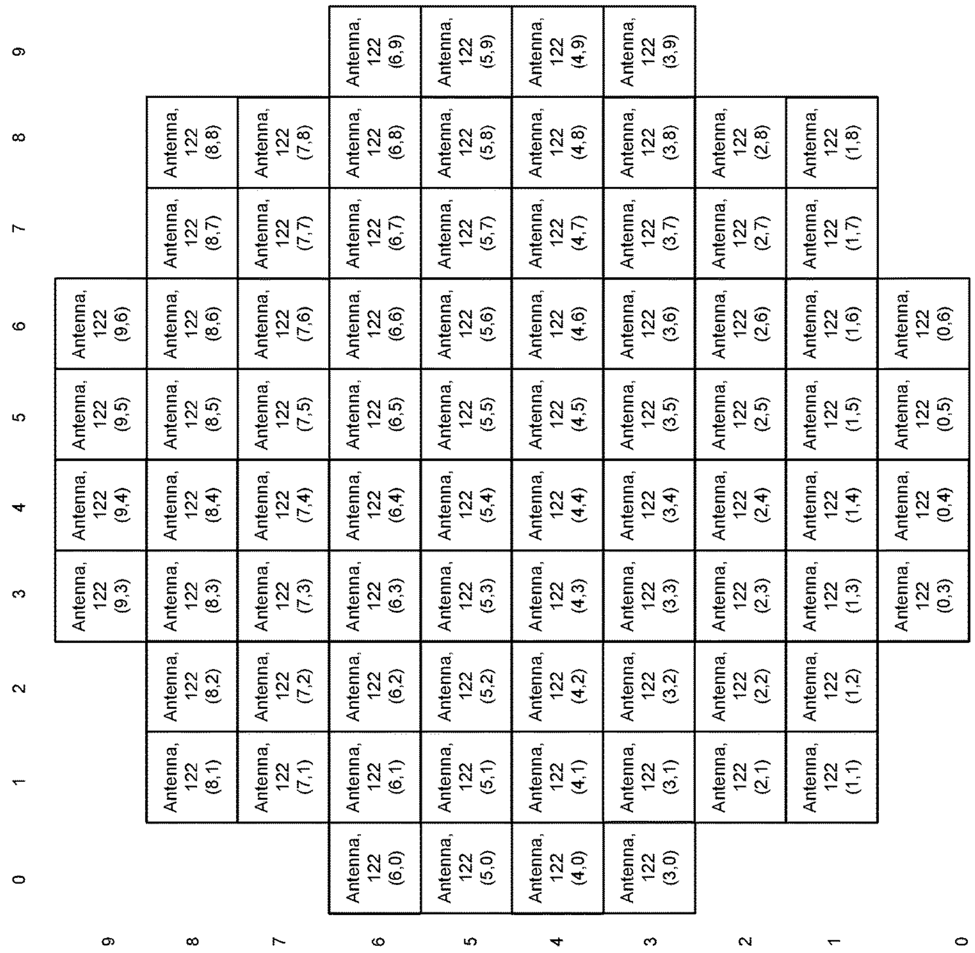
FIG. 5 is a schematic view of an example antenna layout of a phased array antenna.

FIG. 5 shows a schematic view of an example antenna array 120 with a plurality of antenna elements 122. In this example, a grid may be used to lay out the antenna elements 122 to assist in ease of explanation and provide a grid number system. In some examples, any arrangement of antenna elements 122 can be used, such as, but not limited to, circular, triangular, rhombus-shaped, fractal, etc. configurations. In one example, the antenna element 122 at (8,1) (row, column) may be used as a starting point to calibrate the antenna element 122 at (8,3) to match (in phase and/or gain), by using the antenna element 122 at (8,2) as either the transmitting or receiving antenna element 122. Next, the antenna element at (8,5) may be calibrated by match the antenna element 122 at (8, 3) by using the antenna element 122 at (8,4). This may be repeated down the antenna array 120, with the antenna element 122 at (8,1) being used to calibrate the antenna element 122 at (6,1) to match, by using the antenna element 122 at (7,1) as the receiving or transmitting antenna element 122. This process may be repeated across the antenna array 120 to calibrate the antenna elements 122. In at least one example, the calibration routine 400 executes iteratively, using different antenna elements 122 as a starting reference, and averaging the results to improve the consistency of the calibration across the system and to eliminate any cumulative errors that occur between each calibration to the next.

Phased Array Antenna Leveling

In some implementations, the calibration routine 400 may determine a calibration adjustment 330, which includes a gain adjustment 332 to equalize the gain 126 of a corresponding antenna element 122 to the root gain 312 of the manifold root 310 and a phase adjustment 334 to equalize the phase 124 of the corresponding antenna element 122 to the root phase 314 of the manifold root 310, for each antenna element 122 of the phased array antenna 100 by traversing the phased array antenna 100 in a stepwise fashion. In other implementations, the calibration routine 400 determines calibration adjustments 330 for clusters 128 of antenna elements 122 and then determines a leveling adjustment 340 for each antenna element 122 of the phased array antenna 100 to reconcile the clusters 128 and level the phased array antenna 100. The leveling adjustment 340 includes a gain-code 336 and a phase-code 338 based on a mathematical or physical optimization of the calibration adjustments 330 for the corresponding antenna element 122 within corresponding clusters 128 of antenna elements 122. The calibration routine 400 includes adjusting the phase 124 and the gain 126 of each antenna element 122 of the phased array antenna 100 based on the corresponding leveling adjustment 340 to equalize a transmission gain and a transmission phase of pairs of signal paths (via the manifold 300) included in the phased array antenna 100. Compared to the stepwise approach, the cluster-leveling approach can reduce the number of measurements by a factor of 10 while achieving similarly low levels of variation across the set of calibrated antenna elements 122

FIG. 6A shows a schematic view of an example phased antenna array 120 with a plurality of antenna elements 122 grouped in clusters 128. A cluster 128 may be defined as any collection of antenna elements 122 that are equidistant from a common antenna element 122. Multiple transmit antenna elements 122 may provide multiple calibration points, creating multiple overlapping or non-overlapping clusters 128 for leveling the antenna array 120. Leveling the antenna array 120 for phase 124 may be the process of optimizing the phase code 338 and the phase adjustment 334 for each antenna element 122 to result in a similar phase 124 emitted by that antenna element 122, relative to all other antenna elements 122. Similarly, leveling the antenna array 120 for gain 126 may be the process of optimizing the gain code 336 and gain adjustment 332 for each antenna element 122 to result in a similar phase 124 emitted by that antenna element 122 relative to all other antenna elements 122. For example, the antenna element 122 at (4,4,TX) may be used as the transmission antenna element 122 to perform the calibration routine 400 to match the phase 124 and the gain 126 to a cluster 128 of four receive antenna elements 122 that are equidistant from the element 122 at (4,4,TX). A selected "A" cluster 128 of antenna elements 122 may include the antenna element 122 at (3,4,A1), the antenna element 122 at (4,5, A2), the antenna element 122 at (5,4,A3), and the antenna element at (4,3,A4), as they are geometrically equidistant from the antenna element 122 at (4,4,TX). A second "B" cluster 128 of antenna elements 122 related to the transmission antenna element (4,4,TX) may include the antenna element 122 at (3,4,B1), the antenna element 122 at (5,5, B2), the antenna element 122 at (5,3,B3), and the antenna element 122 at (3,3,B4). Each of these antenna elements 122 in the cluster 128 may have a unique calibration adjustment 330, which may include a corresponding gain adjustment 332 via a gain code 336 and/or a corresponding phase adjustment 334 via a phase code 338. The transmitting antenna element 122 may be switched to create additional clusters 128, including clusters that may overlap. The overlapping clusters 128 may result in multiple calibration adjustments 330 for a given antenna element 122 in the phased antenna array 120. For example, the "A" cluster 128 may include calibration adjustments 330 for the antenna element 122 at (4,5,A2). Subsequently, a different antenna element 122, such as the antenna element 122 at (3,5,B1), may be selected as the transmission antenna element 122. One of the new clusters 128 that may be measured surrounding the antenna element 122 at (3,5,B1) may include the antenna element 122 at (4,5,A2), the antenna element 122 at (3,4,A1), the antenna element 122 at (2,5,D1), and the antenna element 122 at (3,6,D2). The antenna element 122 at (4,5,A2) and the antenna element 122 at (3,4,A1) now have multiple calibration adjustments 330 for each measurement related to the antenna element 122 at (3,5,B1) and the antenna element 122 at (4,4,TX). The A, B, C, and D clusters 128 may be overlapping.

Figure 6B:
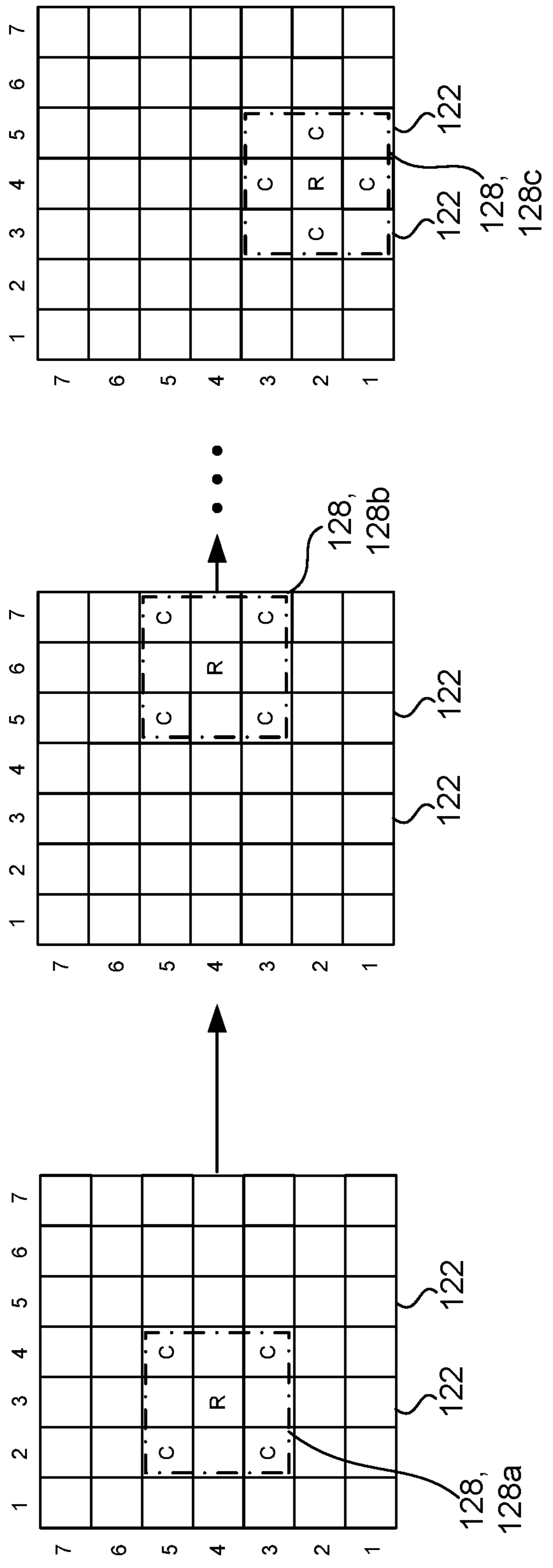
FIG. 6B is a schematic view of another example antenna layout of a phased array antenna showing non-overlapping clusters.

FIG. 6B shows a schematic view of a phased array antenna 100 with clusters 128 of antenna elements 122. In one example, the clusters 128 are not overlapping. For illustration reasons, the reference antenna element 122 is marked with a "R" and four example calibration antenna elements 122 are marked with a "C" and the respective reception or transmission may be dependent on which calibration routine 400 or portion of the calibration routine 400 that the phased array antenna 100 is performing, and may not be fixed to either reception or transmission. In some implementations, the calibration routine 400 identifies clusters 128 of antenna elements 122. A first cluster 128, 128*a* may be centered around a reference antenna element 122, R at (4,3) (row, column) with four calibration antenna elements 122, C located at (3,2), (3,4), (5,2), and (5,4), generating a set of calibration adjustments 330 for each calibration antenna element 122, C. In the example shown, the calibration routine 400 moves the reference antenna element 122, R to the antenna element 122 at (4, 6), creating a second cluster 128, 128*b*. The second cluster 128, 128*b* is centered around the reference antenna element 122, R at (4,6) with four calibration antenna elements 122, C located at (3,5), (3,7), (5,5), and (5,7), generating a set of calibration adjustments 330 for each calibration antenna element 122. In the example shown, the calibration routine 400 moves the reference antenna element 122, R again to the antenna element 122 at (2, 4), creating a third cluster 128, 128*c*. The third cluster 128, 128*c* is centered around the reference antenna element 122, R at (2,4) with four calibration antenna elements 122, C located at (1,4), (2,3), (3,4), and (2,4), generating a set of calibration adjustments 330 for each calibration antenna element 122. The clusters 128 may or may not overlap and may be defined by any group of two or more antenna elements 122 spaced equidistant from a transmitting or receiving calibration antenna element 122. In some examples, the outer bounds of the cluster 128 overlap, but do not include common antenna elements 122 between one or more clusters 128.

Figure 6C:
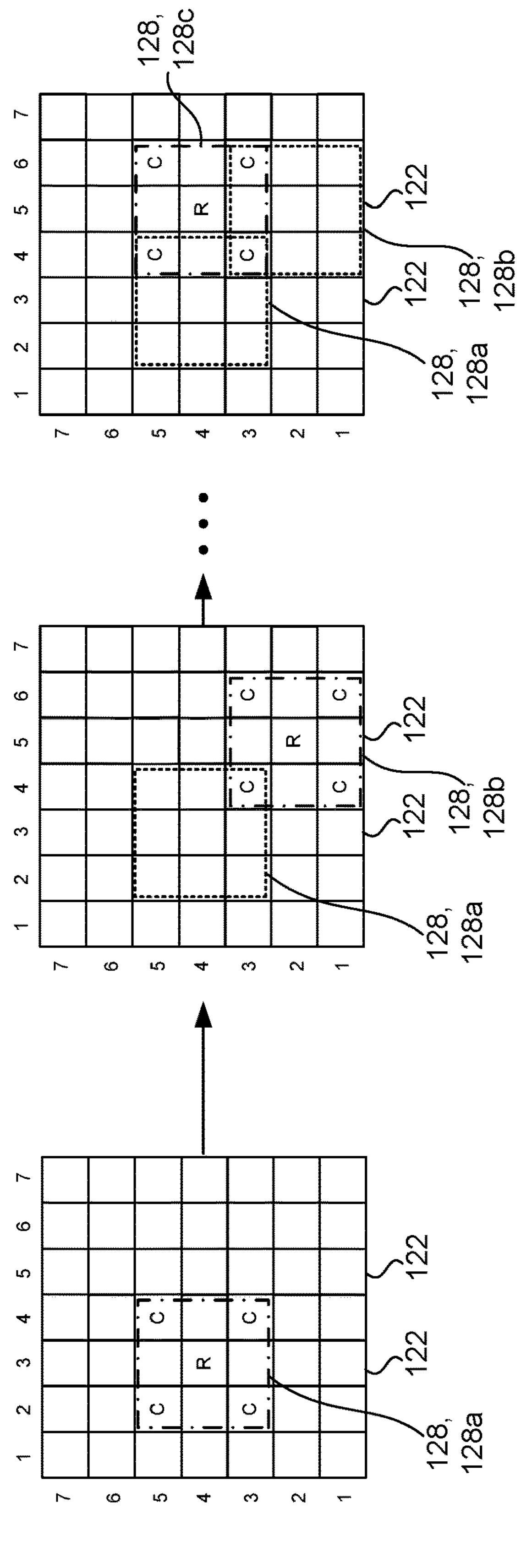
FIG. 6C is a schematic view of another example antenna layout of a phased array antenna showing overlapping clusters.

FIG. 6C shows a schematic view of a phased array antenna 100 with overlapping clusters 128. In some examples, the clusters 128 are overlapping using common antenna elements 122 between one or more clusters 128. Again, for illustration reasons, the reference antenna element 122 is marked with a "R" and the calibration antenna element 122 is marked with a "C" and the respective reception or transmission may be dependent on which calibration routine 400 or portion of the calibration routine 400 that the phased array antenna 100 is performing and may not be fixed to either reception or transmission. A first cluster 128, 128*a* may be centered around a reference antenna element 122, R at (4,3) (row, column) with four calibration antenna element 122, C located at (3,2), (3,4), (5,2), and (5,4) generating a set of calibration adjustments 330 for each calibration antenna element 122. In the example shown, the calibration routine 400 moves the reference antenna element 122, R to the antenna element 122 at (2, 5), creating a second cluster 128, 128*b*. The second cluster 128, 128*b* is centered around the reference antenna element 122, R at (2,5) with four calibration antenna element 122, C located at (1,4), (3,4), (3,6), and (1,6), generating a set of calibration adjustments 330 for each calibration antenna element 122. The antenna element 122 at (3,4) may be common to both the first cluster 128, 128*a* and the second cluster 128, 128*b*, yet the antenna element 122 at (3,4) may have a different set of calibration adjustments 330 depending on the selected reference antenna element 122, R. When the array is fully calibrated, these differing calibration adjustments 330 are reconciled into a single set of calibration adjustments 330, which are applied to the antenna element 122 at (3,4) to set its gain adjustment 332 and phase adjustment 334. The differing calibration adjustments 330 may include different gain adjustments 332 and phase adjustments 334 for transmit and receive modes, different operating frequencies, and different operating environments, etc. In the example shown, the calibration routine 400 moves the reference antenna element 122, R again to the antenna element 122 at (4, 5), creating a third cluster 128, 128*c*. The third cluster 128, 128*c* is centered around the reference antenna element 122, R at (4,5) with four calibration antenna elements 122,C located at (3,4), (5,4), (5,6), and (3,6), generating a set of calibration adjustments 330 for each calibration antenna element 122. The antenna element 122 at (3,4) may be common to both the first cluster 128, 128*a*, the second cluster 128, 128*b*, and the third cluster 128, 128*c*. Yet, the antenna element 122 at (3,4) may have a different set of calibration adjustments 330 depending on the selected reference antenna element 122, R. The antenna element 122 at (5,4) may be common to both the first cluster 128, 128*a* and the third cluster 128, 128*c*; yet the antenna element 122 at (5,4) may have a different set of calibration adjustments 330 depending on the selected reference antenna element 122, R. Moreover, the antenna element 122 at (3,6) may be common to both the second cluster 128, 128*a* and the third cluster 128, 128*c*, yet the antenna element 122 at (3,6) may have a different set of calibration adjustments 330, depending on the selected reference antenna element 122, R.

The clusters 128 may overlap and may be defined by any group of two or more calibration antenna elements 122, C spaced equidistant from a transmitting or receiving reference antenna element 122, R, using one or more common antenna elements 122 amongst the clusters 128. In some examples, the outer bounds of the cluster 128 overlap and include common antenna elements 122 between one or more clusters 128. In additional examples, each cluster 128 of calibration antenna elements 122,C has six combinations or twelve permutations of pairs of calibration antenna elements 122, C. When clusters 128 are near to the edge of the phased antenna array 100, some of the calibration antenna elements 122, C may physically not exist in the array, in which case they may not participate in pairwise equalization procedures with other calibration antenna elements, 122, C of that particular cluster.

In some implementations, the calibration routine 400 determines each of the gain codes 336 and the phase codes 338 by applying an optimization function, g, such as a least-squares fit, to code deltas or differences between the gain code 336 and/or the phase code 338 from a nominal value. In example equation 1, a matrix includes differences in gain codes 336 from a nominal gain value, where the differences are computed as a code offset of gain code 336 or phase code 338 between two calibration elements 122, C that were needed in the calibration routine 400*b* in order to equalize their corresponding gains 126 and phases 124. Each column of the matrix corresponds to a calibration antenna element 122 and each row corresponds to a pairwise measurement operation (e.g. the results of calibration routine 400*b*) performed on the antenna elements 122 corresponding to columns in which the matrix entry is nonzero. The calibration routine 400 computes a vector of idealized code offsets, g, to determine idealized gain code offsets 336 for each row by applying the optimization function, $$g_{\vec{c}_{opt}}.$$

The calibration routine 400 executes the same process for the phase codes 338. This computation may be a least-square error or "least-squares" computation of the over-determined linear algebra system of equations, as shown below in equation 1.

$$\begin{bmatrix} +1 & -1 & 0 & 0 \\ +1 & 0 & -1 & 0 \\ +1 & 0 & 0 & -1 \\ 0 & +1 & -1 & 0 \\ 0 & +1 & 0 & -1 \\ 0 & 0 & +1 & -1 \end{bmatrix} * g_{\vec{c}_{opt}} = \begin{bmatrix} +3 \\ -1 \\ -3 \\ -5 \\ -6 \\ -2 \end{bmatrix} \rightarrow g_{\vec{c}_{opt}} = \begin{bmatrix} -0.25 \\ -3.5 \\ +1 \\ 2.75 \end{bmatrix} \quad \text{EQ. (1)}$$

The optimization function may use methods other than the least-squares to determine the cluster level optimization. In some examples, the cluster optimization is not an over-determined system of equations and, instead, is determined based only on the direct measurements. Moreover, the calibration routine 400 may include averaging the measurements before populating equation 1. Computing an over determined system of equations in this way, using a least-squares linear algebra solution, may inherently provide some degree of averaging of noisy or imperfect data.

Executing the calibration routine 400 for multiple clusters 128 may result in deviations in the gain codes 336 from the nominal gain value and deviations in the phase codes 338 from a nominal phase value. The optimized gain codes 336 and the optimized phase codes 338 determined by equation 1 may not be realizable integer values and instead may be kept as floating point values in order to reduce intermediate quantization error. The cluster measurements performed by the calibration routine 400 may relate to a single disjoint subset of the phased array antenna 100. To reconcile gain 336 and phase 338 codes for all antenna elements 122, the calibration routine 400 executes a cluster level calibration and estimation procedure for many clusters 128 surrounding many reference antenna elements 122 and merges the results to provide a phased array antenna leveling measurement 340 of gain codes 336 and phase codes 338 for every antenna element 122 in the phased antenna array 100. By executing the calibration routine 400 on many clusters 128 across the phased array antenna 100, the calibration routine 400 may reconcile and average partially-overlapping data sets consisting of gain codes 336 and phase codes 338 computed from disparate clusters 128. This reconciliation of cluster-level measurements may reduce noise, quantization error, and systematic offsets in cluster-level measurements, thus improving the accuracy of the calibration routine 400 when considering the ensemble of all antenna elements 122 comprising the phased antenna array 120

The calibration routine 400 populates an otherwise-empty gain array, such as matrix meas shown in equation 2, and an otherwise-empty phase array, with the corresponding optimized gain codes 336 and the corresponding optimized phase codes 338 derived by computing the optimized cluster-level vector $$g_{\vec{c}\,opt},$$

as described earlier.

Each vector g encodes the relative code deltas that would best equalize the elements within a single cluster 128, if the gain codes 336 and the phase codes 338 could be of arbitrary precision and not restricted to being integers or binary values. The process for computing a cluster-level vector, g, is defined by equation 1.

$$meas = \begin{bmatrix} -0.25 & -3.5 & 1 & 2.75 & nan & nan & nan & nan & nan & nan & nan & nan \\ nan & nan & nan & nan & nan & nan & -1 & 5 & -2 & -2 & nan & nan \\ nan & nan & nan & nan & nan & nan & nan & 5.75 & -1.25 & nan & -1.25 & -3.25 \\ nan & -2.25 & nan & 0.75 & nan & nan & nan & 1.75 & -0.25 & nan & nan & nan \end{bmatrix} \quad \text{EQ. (2)}$$

In the example shown in equation 2, each row of the matrix meas corresponds to the optimized gain codes 336 from equation 1. Each column of the matrix meas corresponds to an antenna element 122. For example, the results of the equation 1 were −0.25, −3.5, 1, and 2.75, which correspond to the first four columns in row one of the matrix meas in equation 2. Each column corresponds to a single antenna element 122 of the phased array antenna 100. There are many empty entries, recorded as NaN or not a number; which indicate that the antenna element 122 corresponding to that column did not participate in the calibration procedure for the cluster 128 corresponding to that particular row of the matrix in equation 2. The calibration routine 400 populates the matrix of this format in the same fashion. In some examples, the matrix meas is a sparse matrix. The use of a sparse matrix may conserve memory. The sparse matrix may have valid entries, which are zero, whereas, in this example, non-participating elements are simply missing, not a number, or a null value Each row of the matrix meas may encode relative differences between a few antenna elements 122, but the relationship between rows of the matrix meas may not be known. The calibration routine 400 may reconcile the rows of the matrix meas against one another, for example, by aligning all the rows of measurements taken for each cluster 128. To reconcile all the clusters 128, the calibration routine 400 adds a value uniformly to every entry in a given row, as shown in equation 3.

$$shiftmat\left(\vec{sh}\right) = \begin{bmatrix} sh_1 & sh_1 & \dots & sh_1 & sh_1 \\ sh_2 & sh_2 & \dots & sh_2 & sh_2 \\ sh_3 & sh_3 & \dots & sh_3 & sh_3 \\ & & \dots & & \end{bmatrix} = \quad \text{EQ. (3)}$$

$$\begin{bmatrix} sh_1 \\ sh_2 \\ \dots \\ sh_{Nmeas} \end{bmatrix} * [1 \;\; 1 \;\; \dots \;\; <N_{RXelems}> \;\; \dots \;\; 1]$$

Referring to equation 3, the calibration routine 400 adds sh1 to each entry of row 1, sh2 to each entry of row2, etc. This may be depicted mathematically as a matrix shiftmat, which may be the outer product of a row-shift vector and a vector of ones. This matrix may be the same size as the matrix meas. To perform shifting of each row of measurements for gain codes 336 or phase codes 338, the calibration routine 400 adds the matrix meas from equation 2 to the matrix shiftmat from equation 3. The matrix Shiftmat of equation 3 may depend on values sh1, sh2, etc. that are adjustable in a numerical optimization procedure, and therefore shiftmat would be a function that returns a matrix or a "matrix function". The calibration routine 400 applies a shift vector sh1, sh2, etc. to the input of the matrix function Shiftmat to result in a particular offset added to each entry of the measurement matrix. The calibration routine 400 may construct a cost function, such as the cost function $$\text{cost}(\overrightarrow{sh})$$

of equation 4, to feed to a numerical optimizer Optimization based on the matrix meas from equation 2 and the result of the matrix shiftmat from equation 3.

$$\text{cost}(\overrightarrow{sh}) = \sum_{col=1}^{Nmeas} \text{var}\left(\left(meas + shiftmat(\overrightarrow{sh})\right)[:, col]\right) \quad \text{EQ. (4)}$$

$$\text{Optimization } \min_{\overrightarrow{sh}}\left(\text{cost}(\overrightarrow{sh})\right) \quad \text{EQ. (5)}$$

The numerical optimizer definition Optimization of equation 5 may seek to minimize the $$\text{cost}(\overrightarrow{sh})$$

of equation 4 by adjusting the shift vector in the matrix shiftmat of equation 3. In one example, the cost function $$\text{cost}(\overrightarrow{sh})$$

of equation 4 is the sum of variance of each column of the matrix meas+the matrix shiftmat, as the matrix shiftmat depends on the shift vector defined in equations 3 and 4 above. The cost function $$\text{cost}(\overrightarrow{sh})$$

of equation 4 may minimize the summed variance of each column subject to a constraint that the relative offsets in any given row are maintained. This operation corresponds to reconciling all cluster measurements in a manner that numerically minimizes uncertainty in the settings for each antenna element 122, where larger statistical variance is taken as a proxy for uncertainty. This may account for cluster-to-cluster deviations, but maintains the gain codes 336 and the phase codes 338 encoded in the corresponding gain array (e.g., the matrix meas of equation 2) and the corresponding phase array and the optimizations of the gain codes 336 and the phase codes 338 obtained by equation 1 and computed from each cluster 128. The result of equation 5 may be a shift vector, and hence a shift matrix, which may be optimal in that, when the shift matrix is added to the measurement matrix, the columns have minimum variance, and the average of the columns provide estimates for the corresponding gain codes 336 and the corresponding phase codes 338 for each antenna element 122. A separate shift matrix, measurement matrix, and numerical optimization procedure may be used for calibrating the gain 126 and the phase 124, as the transceiver modules 220 are assumed to provide approximately independent control of signal gain 126 and phase 126 passing through them.

In some examples, the gain codes 336 and the phase codes 338 are converted to useful code values from the result of the numerical optimizer Optimization of equation 5 by applying the shift matrix shiftmat to the matrix meas of equation 2 (using simple addition), and then taking the average of each column. This may result in a corresponding array of floating-point gain codes 336 and a corresponding array of floating-point phase codes 338 for each particular antenna element 122, and then these floating-point results may be rounded to the nearest gain code 336 or the nearest phase codes 338, respectively. The calibration routine 400 may apply the resulting rounded gain codes 336 and rounded phase codes 338 to the antenna element 122 associated with the corresponding column resulting from the numerical optimizer Optimization of equation 5.

In an example test, simulating the calibration routine 400 one hundred times on a randomized phased array antenna 100, with 384 elements 122, each with a random antenna element variation consisting of 5.625 degree steps of phase 124 for each phase code 338, 10 degree phase offset standard deviation among elements 122, 0.25 dB steps of gain 126 for each gain code 336, and 1 dB gain offset standard deviation among elements 122, resulted in 1.77-2.04 degree standard deviation in phase 124 across the phased array antenna 100, depending on which clusters 128 were selected. Furthermore, for 2.04 degrees of standard deviation in the calibrated phase, the entire calibration routine 400 required fewer than two thousand pairwise equalization procedures among elements 122. Equation 6 represents an example theoretical limit to this performance that could be expected in the presence of uniform quantization noise if a perfect calibration routine 400 could be realized.

$$\frac{5.625}{\sqrt{12}} = 1.62 \text{ degrees} \quad \text{EQ. (6)}$$

By determining the calibration adjustments 330 for clusters 128 of antenna elements 122 and then reconciling the clusters 128 by determining, the leveling adjustments 340 to equalize a transmission gain and a transmission phase of each signal path (via the manifold 300) of the phased array antenna 100, the calibration routine 400 does very well in bringing the standard deviation down from large levels of plus or minus 10 degrees to very near a theoretical noise floor and ideal result of 1.62 degrees. Moreover, the calibration routine 400 may be executed on one, two and three dimensional phased antenna arrays 120, as the mathematical formulation described previously is the same irrespective of the shape, size, or orientation of the array. In some implementations, the calibration routine 400 includes different versions or mathematical statements of the matrices described above; and any computational system that accomplishes the same optimization result is suitable.

Figure 7:
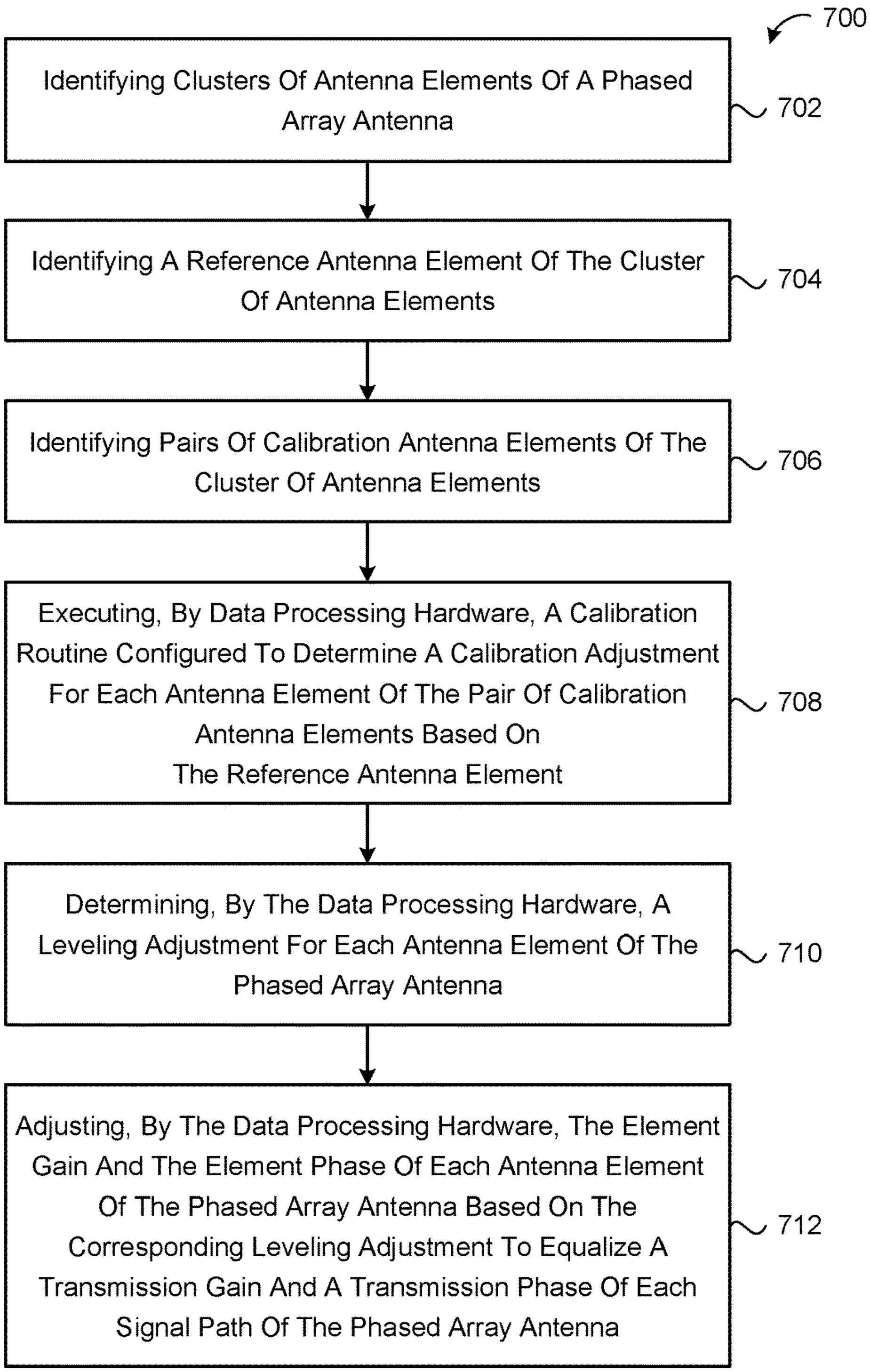
FIG. 7 is a schematic view of a method for calibrating a phased array antenna.

FIG. 7 shows an example method 700 for calibrating a phased array antenna 100. With additional reference to FIGS. 3 and 4, which illustrate example phased array antennas 100, at block 702, the method 700 includes identifying clusters 128 of antenna elements 122 of a phased array antenna 100. Each antenna element 122 may include a transceiver 220 to operate the antenna element 122. The phased array antenna 100 may be connected to a manifold 300 configured to route signals, such as a reference signal 228, between a manifold root 310 and manifold terminals 320 along corresponding signal paths. Each manifold terminal 320 may be connected to a respective antenna element 122 or transceiver 220 connected to the antenna element 122 of the phased array antenna 100. The manifold root 310 may have a root signal level or gain 312 and a root phase 314 related to the combination of the phase 124 and the gain 126 input by the antenna elements 122 or transceivers 220 to the manifold 300. At block 704, for each cluster 128 of antenna elements 122, the method 700 includes identifying a reference antenna element 122, R of the cluster 128 of antenna elements 122. At block 706, the method 700 includes identifying pairs of calibration antenna elements 122, C of the cluster 128 of antenna elements 122. Each pair of calibration antenna elements 122 may be located equidistantly from the reference antenna element 122. In some examples, there are more than two calibration antennas elements 122, C in a pair. At block 708, for each pair of calibration antenna elements 122, the method 700 includes executing, by data processing hardware 1000, a calibration routine 400 configured to determine a calibration adjustment 330 for each antenna element 122 of the pair of calibration antenna elements 122, C based on the reference antenna element 122, R. The calibration adjustment 330 may include a gain adjustment 332 to equalize an element gain 126 of the corresponding antenna element 122 to the root signal level or gain 312 of the manifold root 310 and a phase adjustment 334 to equalize an element phase 124 of the corresponding antenna element 122 to the root phase 314 at the manifold root 310. The gain adjustment 332 may be adjusted by changing a value in a gain code 336. The phase adjustment 334 may be adjusted by changing a value in a phase code 338. The gain adjustment 332 and phase adjustment 334 may be adjusted according to the calibration routine 400. At block 710, the method 700 may also include determining, by the data processing hardware 1000, a leveling adjustment 340 for each antenna element 122 of the phased array antenna 100. The leveling adjustment 340 may be computed by determining the gain codes 336 and phase codes 338 for each antenna element 122 in a cluster 128. The leveling adjustment 340 may include a gain-code 336 and a phase-code 338 based on an optimization of the calibration adjustments 330 for the corresponding antenna element 122 within the corresponding clusters 128 of antenna elements 122. At block 712, the method 700 may further include adjusting, by the data processing hardware 1000, the element gain 126 and the element phase 124 of each antenna element 122 of the phased array antenna 100 based on the corresponding leveling adjustment 340 to equalize a transmission gain 126 and a transmission phase 124 of each signal path of the phased array antenna 100. The element gain 126 and the element phase 124 of each antenna element 122 may be adjusted by adjusting a gain code 336 and a phase code 338 implemented in the transceiver 220. The transceiver 220 may implement the requested calibration adjustment 330 and leveling adjustment 340 by adjusting a phase 124 or gain 126 in the transmit module 222 or receiver module 224. The gain code 336 and phase code 338 may be part of the calibration adjustment 330.

In some implementations, each gain adjustment 332 includes a deviation in the gain-code 336 from a nominal gain value of the gain code 336 and each phase adjustment 334 includes a deviation in the phase-code 338 from a nominal phase value of the phase code 338. Determining the leveling adjustment 340 for each antenna element may include populating, by the data processing hardware 1000, a gain adjustment matrix (e.g., the matrix meas in equation 2) with the gain adjustments 332 and populating, by the data processing hardware 1000, a phase adjustment matrix (a matrix similar to the measurement matrix meas in equation 2, but corresponding to phase code 338 values) with the phase adjustments 334. Each adjustment matrix may include columns and rows, each column corresponding to an antenna element 122 and each row corresponding to a cluster 128 of antenna elements 122. For each adjustment matrix, the method 700 may include: i) adding, by the data processing hardware 1000, a shift applied to each row of the adjustment matrix, for example by adding the matrix Shiftmat of equation 3, the shift matrix aligning adjustments by antenna element 122; ii) averaging, by the data processing hardware 1000, the adjustments of each column of the adjustment matrix; and iii) rounding each averaged adjustment of either phase adjustment 334 or gain adjustment 332 to a nearest integer, the nearest integer being the corresponding gain-code 336 or phase-code 338. In some examples, for each adjustment matrix, the method includes minimizing a variance of each column subject to a constraint that relative offsets in a given row is maintained, such as the cost function of equation 4. Each row of each adjustment matrix may correspond to a least-squares fitting of the corresponding adjustments of the corresponding cluster 128 of the antenna elements 122. The clusters 128 of the antenna elements 122 may overlap and may use common antenna elements 122 in multiple clusters 128.

In some implementations, the reference antenna element 122 is a transmitter antenna element 122 and the pairs of calibration antenna elements 122 are pairs of receiver antenna elements 122. The calibration routine 400 may include, for each pair of receiver antenna elements 122, transmitting a reference signal 228 from the transmitter antenna element 122 and receiving the reference signal 228 at the receiver antenna elements 122. The received reference signal 228 at each receiver antenna element 122 may have a corresponding receive gain 126 and a corresponding receive phase 124. The method 700 may also include determining, by data processing hardware 1000, the gain adjustments 334 to equalize the respective element gains 126 of each receiver antenna element 122 to the root gain 312 of the manifold root 310 based on the receive gains 126 and determining, by the data processing hardware 1000, the phase adjustments 334 to equalize the respective element phases 124 of each receiver antenna element 122 to the root phase 314 of the manifold root 310 based on the receive phases 124.

The method 700 may further include summing the received reference signals 228 of the pair of receiver antenna elements 122; receiving the summed signal from the reference signal 228 in a peak detector 230 connected to the manifold 300; and adjusting the element phase 124 and/or the element gain 126 of each receiver antenna element 122 of the pair of receiver antenna elements 122 based on an output of the peak detector 230. The method 700 may also include adjusting the element phase 124 of one of the receiver antenna elements 122 of the pair of receiver element antenna elements 122 so that the output of the peak detector 230 may be maximized. In some examples, the method 700 includes shifting the element phase 124 of one of the receiver antenna elements 122 of the pair of receiver elements 122 by 180 degrees and adjusting the element gain 126 of the other of the receiver antenna elements 122 of the pair of receiver elements 122 so that the output of the peak detector 230 is minimized.

In some implementations, the reference antenna element 122 is a receiver antenna element 122 and the pairs of calibration antenna elements 122 are pairs of transmitter antenna elements 122. The calibration routine 400 may include, for each pair of transmitter antenna elements 122, transmitting a reference signal 228 from each transmitter antenna element 122 of the pair of transmitter antenna elements 122 and receiving the reference signals 228 at the receiver antenna element 122. Each received reference signal 228 at the receiver antenna element 122 may have a corresponding receive gain 126 and a corresponding receive phase 124. The method 700 may also include determining, by data processing hardware 1000, the gain adjustments 334 to equalize the respective element gains 126 of each transmitter antenna element 122 to the root gain 312 of the manifold root 310 based on the receive gains 126, and determining, by the data processing hardware 1000, the phase adjustments 334 to equalize the respective element phases 124 of each transmitter antenna element 122 to the root phase 314 of the manifold root 310 based on the receive phases 124. The method 700 may also include summing the received reference signals 228 of the receiver antenna element 122, receiving the summed signal in a peak detector 230, and adjusting the element phase 124 and/or the element gain 126 of each transmitter antenna element 122 of the pair of transmitter antenna elements 122 based on an output of the peak detector 230. The method 700 may also include adjusting the element phase 124 of one of the transmitter antenna elements 122 of the pair of transmitter elements 122 so that the output of the peak detector 230 may be maximized. In some examples, the method 700 includes shifting the element phase 124 of one of the transmitter antenna elements 122 of the pair of transmitter elements 122 by 180 degrees, and adjusting the element gain 126 of the other of the transmitter antenna elements 122 of the pair of transmitter elements 122 so that the output of the peak detector 230 is minimized.

Figure 8:
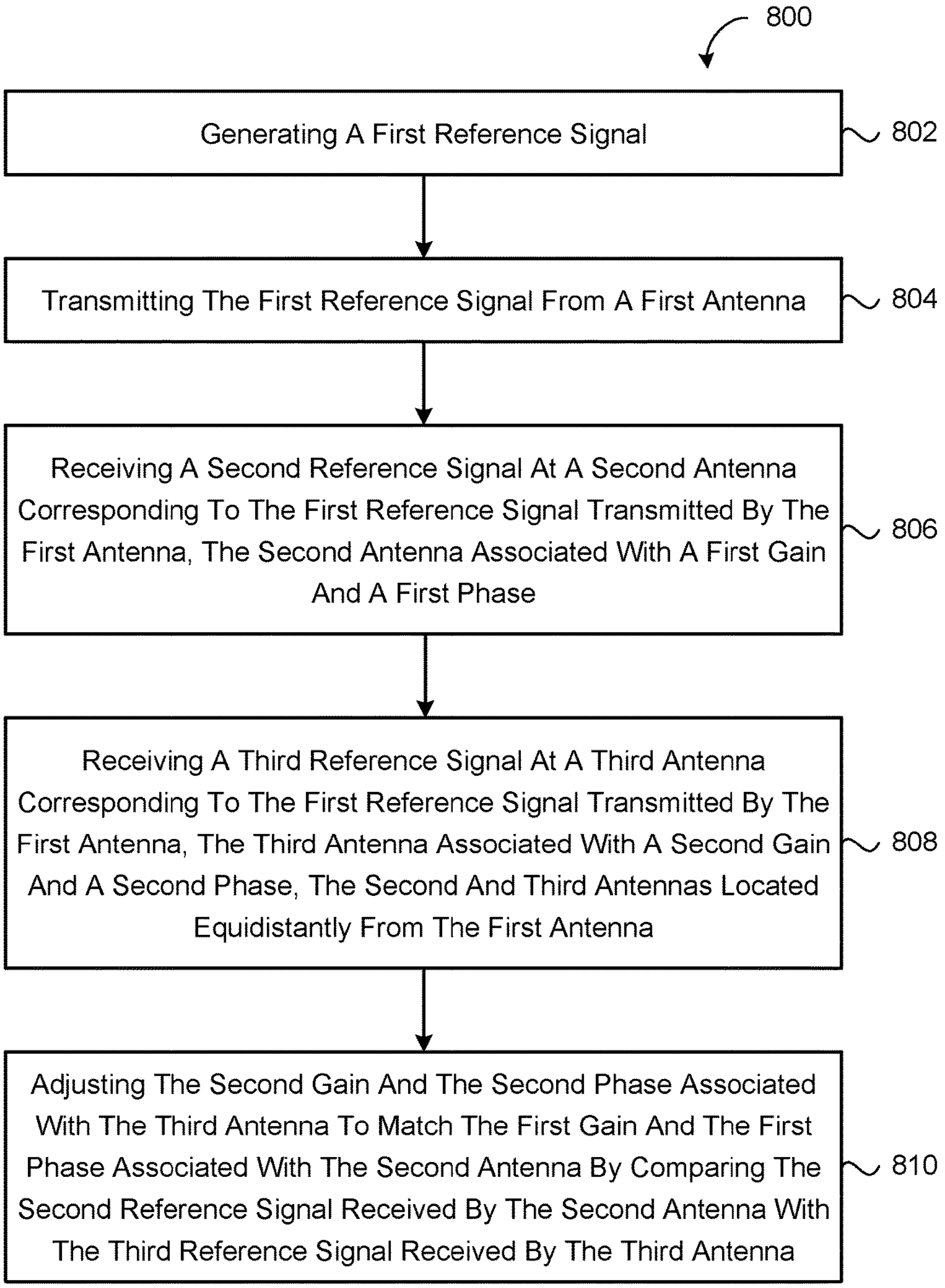
FIG. 8 is a schematic view of a method for calibrating receivers in a phased array antenna.

FIG. 8 shows a method 800 for calibrating the receiver module 224 in a phased array antenna 80. With additional reference to FIGS. 4-6, at block 802, the method 800 includes generating a first reference signal 228. The first reference signal 228 may be generated from a PLL 226 and may be any signal of an appropriate frequency. At block 804, the method 800 includes transmitting the first reference signal 228 from a first antenna element 122, 122*a*. The reference signal 228 from the PLL 226 may be transmitted via a transmit module 222 to an antenna element 122. At block 806, the method 800 includes receiving a second reference signal 228 at a second antenna element 122, 122*b* corresponding to the first reference signal 228 transmitted by the first antenna element 122, 122*a*, the second antenna element 122, 122*b* associated with a first gain 126 and a first phase 124. The second antenna element 122, 122*b* receives the reference signal 228 generated by the PLL 226 transmitted from the first antenna element 122, 122*a* via a receiver module 224. The receiver module 224 includes adjustments to adjust the phase 124 and gain 126 of the reference signal 228 that is being received by the second antenna element 122. At block 808, the method 800 includes receiving a third reference signal 228 at a third antenna element 122, 122*c* corresponding to the first reference signal 228 transmitted by the first antenna element 122, 122*a*, the third antenna element 122, 122*c* associated with a second gain 126 and a second phase 124. The second and third antenna elements 122, 122*b*, 122*c* are located equidistantly from the first antenna element 122, 122*a*. The third antenna element 122, 122*c* receives the reference signal 228 generated by the PLL 226 transmitted from the first antenna element 122, 122*a* via a receiver module 224. The receiver module 224 includes adjustments to adjust the phase 124 and gain 126 of the signal that is being received by the third antenna element 122, 122*c* and/or the second antenna element 122, 122*b*. Both the second antenna element 122, 122*b* and third antenna element 122, 122*c* are located an equal distance from the first antenna element 122, 122*a*. This provides a mutual coupling and allowing any potential outside interference to be equal for both the second antenna element 122, 122*b* and third antenna element 122, 122*c*. At block 810, the method 800 includes adjusting the second gain 126 and the second phase 124 associated with the third antenna element 122, 122*c* to match the first gain 126 and the first phase 124 associated with the second antenna element 122, 122*b* by comparing the second reference signal 228 received by the second antenna element 122, 122*b* with the third reference signal 228 received by the third antenna element 122, 122*c*. As both the second antenna element 122, 122*b* and third antenna element 122, 122*c* are equal distance away from the first antenna element 122, 122*a*, the phase 124 of the received signal may progress the same amount from transmission to reception for both the second antenna element 122, 122*b* and third antenna element 122, 122*c*. The received reference signal 228 received on both the second antenna element 122, 122*b* and third antenna element 122, 122*c* are output through their respective receiver modules 224 and then combined. As with any two signals that are out of phase 124, a destructive cancelling occurs reducing the maximum peak output of the received signal. The receiver module 224 attached to the third antenna element 122, 122*c* second phase 124 output is then adjusted so that the maximum peak of the signal is detected. When the maximum peak of signal is detected, the second antenna element 122, 122*b* and third antenna element 122, 122*c* are closest in phase 124 alignment due to the minimum amount of destructive cancellation occurring. The first phase 124 output of the second antenna element 122, 122*b* attached receiver module 224 may then be shifted 180 degrees. The second gain of the third antenna element's 122, 122*c* attached receiver module 224 is then adjusted so that the peak output of the signal is minimized. Due to the destructive cancellation between the signals, when the signal being received from the third antenna element's 122 attached receiver module 224 and combined with the 180 degree out of phase 124 signal from the second antenna element's 122, 122*b* attached receiver module 224, the second gain of the third antenna element 122, 122*c* is minimized, the signals are as close to being equal in gain as can be reached with the equipment and available adjustment.

Figure 9:
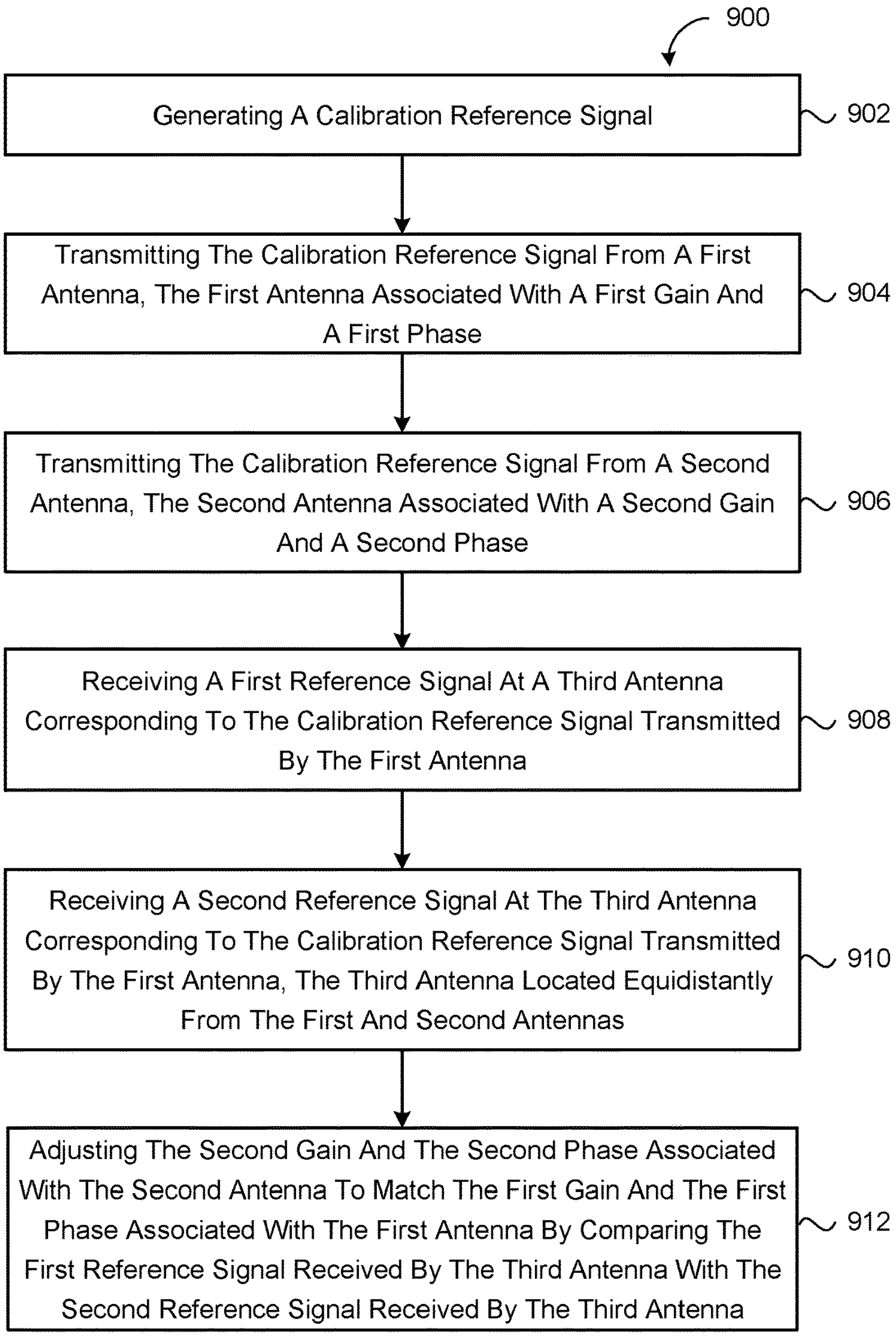
FIG. 9 is a schematic view of a method for calibrating transmitters in a phased array antenna.

FIG. 9 shows a method 900 for calibrating the transmit module 222 in a phased array antenna 100. With additional reference to FIGS. 3, 5 and 6, at block 902, the method 900 includes generating a calibration reference signal 228. The calibration reference signal 228 may be generated from a PLL 226 and may be any continuous signal that is in the appropriate frequency. At block 904, the method 900 includes transmitting the calibration reference signal 228 from a first antenna element 122, 122*a*, which is associated with a first gain 126 and a first phase 124. The reference signal 228 from the PLL 226 may be transmitted via a transmit module 222 to the first antenna element 122, 122*a*. At block 906, the method 900 includes transmitting the calibration reference signal 228 from a second antenna element 122, 122*b*, which is associated with a second gain 126 and a second phase 124. The reference signal 228 from the PLL 226 may be transmitted via a transmit module 222 to the second antenna element 122, 122*b*. The reference signal 228 may be generated from the same PLL 226 that is delivering the reference signal 228 to the first antenna element 122, 122*a* or may be a second PLL 226 that is set to deliver a reference signal 228 at the same frequency. At block 908, the method 900 includes receiving a first reference signal 228 at a third antenna element 122, 122*c* corresponding to the calibration reference signal 228 transmitted by the first antenna element 122, 122*a*. The reference signal 228 generated by the PLL 226 may be received by a third antenna element 122, 122*c* connected to a receiver module 224. At block 910, the method 900 includes receiving a second reference signal 228 at the third antenna element 122, 122*c* corresponding to the calibration reference signal 228 transmitted by the first antenna element 122, 122*a*, the third antenna element 122, 122*c* located equidistantly from the first and second antenna elements 122, 122*a*, 122*b*. The reference signal 228 from the PLL 226 and transmitted by the second antenna element 122, 122*b* is received at the third antenna element 122, 122*c* and its associated receiver module 224. The first antenna element 122, 122*a* and second antenna element 122, 122*b* must be an equal distance away from the third antenna element 122, 122*c*. By the first antenna element 122, 122*a* and second antenna element 122, 122*b* being an equal distance away from the third antenna element 122, 122*c*, the reference signals 228 transmitted by the first antenna element 122, 122*a* and second antenna element 122, 122*b* may combine. At block 912, the method 900 includes adjusting the second gain 126 and the second phase 124 associated with the second antenna element 122, 122*b* to match the first gain 126 and the first phase 124 associated with the first antenna element 122, 122*a* by comparing the first reference signal 228 received by the third antenna element 122, 122*c* with the second reference signal 228 received by the third antenna element 122, 122*c*. Any mismatch in phase 124 between the transmit module 222 of the first antenna element 122 and the combined reference signals 228 of the second antenna element 122, 122*b* may destructively interfere resulting in a lower peak signal output from the third antenna element 122. The second phase 124 of the second antenna element 122, 122*b* is then adjusted to result in the maximum peak of the reference signal received by the third antenna element 122, 122*c*. When the maximum peak occurs, there is minimal destructive interface and the first antenna element 122, 122*a* and second antenna element 122, 122*b* are matched in phase. The first phase 124 of the first antenna element 122, 122*a* is then adjusted 180 degrees. When the first antenna element 122, 122*a* first phase 124 and second antenna element 122, 122*b* second phase 124 are 180 degree out of phase 124 and equal gain, output of the third antenna element 122, 122*c* is minimized. The greater the difference between the first gain 126 of the first antenna element 122, 122*a* and the second gain 126 of the second antenna element 122, 122*b*, the greater the reception of the reference signal may be the third antenna element 122, 122*c*. The second gain 126 of the second antenna element 122, 122*b* is then adjusted to minimize the reception of the reference signal 228 to the third antenna element 122, 122*c*.

In at least one example, the second and third reference signals 228 are summed together and sent to a peak detector 230. By summing the two reference signals 228 together and the addition of the two reference signals 228, any difference in phase 124 or gain 126 may be expressed as difference in output value. After the reference signal 228 has been summed, a peak detector 230 may output the highest voltage of transient waveform in a DC current form. When adjusting the phase 124, the summed reference signals 228 output to the peak detector 230 indicates maximum phase 124 alignment when the peak detector 230 output is maximized. The gain 126 may be adjusted by shifting the phase 124 of one of the reference signals 228 180 degrees. After the phase 124 of the reference signal 228 has been shifted, the two reference signals 228 may be summed and sent to the peak detector 230. The gain 126 of the two reference signals 228 may then be adjusted and is similar when the output of the peak detector 230 is minimized. In at least one example, the reference signal 228 may be amplified and allow for different power level adjustments.

Figure 10:
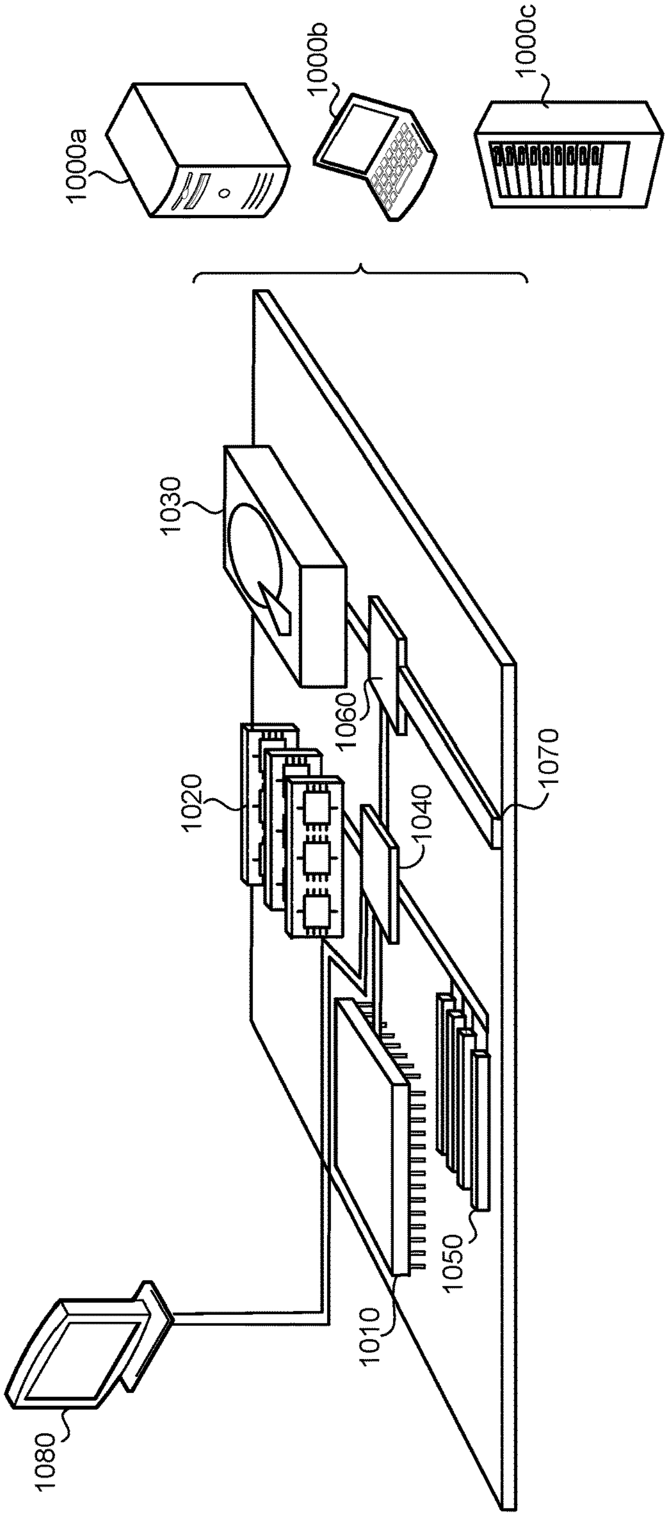
FIG. 10 is a schematic view of exemplary data processing hardware.

FIG. 10 is schematic view of an example computing device 1000 that may be used to implement the systems and methods described in this document. The computing device 1000 is intended to represent various forms of digital computers, such as personal electronic devices, networking hardware, laptops, desktops, workstations, personal digital assistants, servers, blade servers, mainframes, and other appropriate computers. In some implementations, the computing device 1000 is part of wireless networking gear, such as routers, access points, terrestrial "last mile" wireless links, internet portals atop airplanes and ground vehicles, etc. The components shown here, their connections and relationships, and their functions, are meant to be exemplary only, and are not meant to limit implementations of the inventions described and/or claimed in this document.

The computing device 1000 includes a processor 1010, memory 1020, a storage device 1030, a high-speed interface/controller 1040 connecting to the memory 1020 and high-speed expansion ports 1050, and a low speed interface/controller 1060 connecting to low speed bus 1070 and storage device 1030. Each of the components 1010, 1020, 1030, 1040, 1050, and 1060, are interconnected using various busses, and may be mounted on a common motherboard or in other manners as appropriate. The processor 1010 can process instructions for execution within the computing device 1000, including instructions stored in the memory 1020 or on the storage device 1030 to display graphical information for a graphical user interface (GUI) on an external input/output device, such as display 1080 coupled to high speed interface 1040. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1020 stores information non-transitorily within the computing device 1000. The memory 1020 may be a computer-readable medium, a volatile memory unit(s), or non-volatile memory unit(s). The non-transitory memory 1020 may be physical devices used to store programs (e.g., sequences of instructions) or data (e.g., program state information) on a temporary or permanent basis for use by the computing device 1000. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1030 is capable of providing mass storage for the computing device 1000. In some implementations, the storage device 1030 is a computer-readable medium. In various different implementations, the storage device 1030 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1020, the storage device 1030, or memory on processor 1010.

The high speed controller 1040 manages bandwidth-intensive operations for the computing device 1000, while the low speed controller 1060 manages lower bandwidth-intensive operations. Such allocation of duties is exemplary only. In some implementations, the high-speed controller 1040 is coupled to the memory 1020, the display 1080 (e.g., through a graphics processor or accelerator), and to the high-speed expansion ports 1050, which may accept various expansion cards (not shown). In some implementations, the low-speed controller 1060 is coupled to the storage device 1030 and low-speed expansion port 1070. The low-speed expansion port 1070, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 1000 may be implemented in a number of different forms, as shown in the figure. For example, it may be implemented as a standard server 1000*a* or multiple times in a group of such servers 1000*a*, as a laptop computer 1000*b*, or as part of a rack server system 1000*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:

identifying clusters of antenna elements of a phased array antenna, the phased array antenna connected to a manifold configured to route signals between a manifold root and manifold terminals along corresponding signal paths, each manifold terminal connected to a corresponding transceiver of a respective antenna element of the phased array antenna, the manifold root having a root gain and a root phase;

for each cluster of antenna elements:

identifying a reference antenna element of the cluster of antenna elements;

identifying pairs of calibration antenna elements of the cluster of antenna elements, each pair of calibration antenna elements distinct from the reference antenna element and each pair of calibration antenna elements located equidistantly from the reference antenna element; and for each pair of calibration antenna elements, executing, by data processing hardware, a calibration routine configured to determine a calibration adjustment for each antenna element of the pair of calibration antenna elements based on the reference antenna element, the calibration adjustment comprising:

a gain adjustment to equalize an element gain of the corresponding antenna element to the root gain of the manifold root; and a phase adjustment to equalize an element phase of the corresponding antenna element to the root phase of the manifold root;

determining, by the data processing hardware, a leveling adjustment for each antenna element of the phased array antenna, the leveling adjustment comprising a gain-code and a phase-code based on an optimization of the calibration adjustment for the corresponding antenna element within the corresponding clusters of antenna elements; and adjusting, by the data processing hardware, the element gain and the element phase of each antenna element of the phased array antenna based on the corresponding leveling adjustment to equalize a transmission gain and a transmission phase of each signal path of the phased array antenna, wherein the reference antenna element is a transmitter antenna element and the pairs of calibration antenna elements are pairs of receiver antenna elements, and wherein the calibration routine comprises:

for each pair of receiver antenna elements:

transmitting a reference signal from the transmitter antenna element;

receiving the reference signal at the receiver antenna elements, the received reference signal at each receiver antenna element having a corresponding receive gain and a corresponding receive phase;

determining, by data processing hardware, the gain adjustments to equalize the respective element gains of each receiver antenna element to the root gain of the manifold root based on the receive gains; and determining, by the data processing hardware, the phase adjustments to equalize the respective element phases of each receiver antenna element to the root phase of the manifold root based on the receive phases.

2. The method of claim 1, wherein each gain adjustment comprises a deviation in the gain-code from a nominal gain value and each phase adjustment comprises a deviation in the phase-code form a nominal phase value.

3. The method of claim 1, wherein determining the leveling adjustment for each antenna element comprises:

populating, by the data processing hardware, a gain adjustment matrix with the gain adjustments;

populating, by the data processing hardware, a phase adjustment matrix with the phase adjustments, each adjustment matrix comprising columns and rows, each column corresponding to an antenna element and each row corresponding to a cluster of antenna elements; and for each adjustment matrix:

adding, by the data processing hardware, a shift matrix to the adjustment matrix, the shift matrix aligning adjustments by antenna element;

averaging, by the data processing hardware, the adjustments of each column of the adjustment matrix; and rounding each averaged adjustment to a nearest integer, the nearest integer being the corresponding gain-code or phase-code.

4. The method of claim 3, further comprising, for each adjustment matrix, minimizing a variance of each column subject to a constraint that relative offsets in a given row are maintained.

5. The method of claim 3, wherein each row of each adjustment matrix corresponds to a least-squares fitting of the corresponding adjustments of the corresponding cluster of the antenna elements.

6. The method of claim 1, wherein the clusters of antenna elements overlap.

7. The method of claim 1, further comprising:

summing the received reference signals of the pair of receiver antenna elements;

receiving the summed signal in a peak detector; and adjusting the element phase and/or the element gain of each receiver antenna element of the pair of receiver antenna elements based on an output of the peak detector.

8. The method of claim 7, further comprising adjusting the element phase of one of the receiver antenna elements of the pair of receiver elements so that the output of the peak detector is maximized.

9. The method of claim 7, further comprising:

shifting the element phase of one of the receiver antenna elements of the pair of receiver elements by 180 degrees; and adjusting the element gain of the other of the receiver antenna elements of the pair of receiver elements so that the output of the peak detector is minimized.

10. The method of claim 1, wherein the reference antenna element is a receiver antenna element and the pairs of calibration antenna elements are pairs of transmitter antenna elements, and wherein the calibration routine comprises:

for each pair of transmitter antenna elements:

transmitting a reference signal from each transmitter antenna element of the pair of transmitter antenna elements;

receiving the reference signals at the receiver antenna element, each received reference signal at the receiver antenna element having a corresponding receive gain and a corresponding receive phase;

determining, by data processing hardware, the gain adjustments to equalize the respective element gains of each transmitter antenna element to the root gain of the manifold root based on the receive gains; and determining, by the data processing hardware, the phase adjustments to equalize the respective element phases of each transmitter antenna element to the root phase of the manifold root based on the receive phases.

11. The method of claim 10, further comprising:

summing the received reference signals of the receiver antenna element;

receiving the summed signal in a peak detector; and adjusting the element phase and/or the element gain of each transmitter antenna element of the pair of transmitter antenna elements based on an output of the peak detector.

12. The method of claim 11, further comprising adjusting the element phase of one of the transmitter antenna elements of the pair of transmitter elements so that the output of the peak detector is maximized.

13. The method of claim 11, further comprising:

shifting the element phase of one of the transmitter antenna elements of the pair of transmitter elements by 180 degrees; and adjusting the element gain of the other of the transmitter antenna elements of the pair of transmitter elements so that the output of the peak detector is minimized.

14. An antenna system comprising:

a phased array antenna having antenna elements;

a manifold connected to the phased array antenna, the manifold having a manifold root and manifold terminals, the manifold configured to route signals between the manifold root and the manifold terminals along corresponding signal paths, each manifold terminal connected to a respective antenna element of the phased array antenna, the manifold root having a root gain and a root phase;

a calibration module in communication with the manifold and the phased array antenna, the calibration module configured to perform operations comprising:

identifying clusters of antenna elements of the phased array antenna;

for each cluster of antenna elements:

identifying a reference antenna element of the cluster of antenna elements;

identifying pairs of calibration antenna elements of the cluster of antenna elements, each pair of calibration antenna elements distinct from the reference antenna element and each pair of calibration antenna elements located equidistantly from the reference antenna element; and for each pair of calibration antenna elements, executing a calibration routine configured to determine a calibration adjustment for each antenna element of the pair of calibration antenna elements based on the reference antenna element, the calibration adjustment comprising:

a gain adjustment to equalize an element gain of the corresponding antenna element to the root gain of the manifold root; and a phase adjustment to equalize an element phase of the corresponding antenna element to the root phase of the manifold root;

determining a leveling adjustment for each antenna element of the phased array antenna, the leveling adjustment comprising a gain-code and a phase-code based on an optimization of the calibration adjustment for the corresponding antenna element within the corresponding clusters of antenna elements; and adjusting the element gain and the element phase of each antenna element of the phased array antenna based on the corresponding leveling adjustment, wherein the reference antenna element is a transmitter antenna element and the pairs of calibration antenna elements are pairs of receiver antenna elements, and wherein the calibration routine comprises:

for each pair of receiver antenna elements:

transmitting a reference signal from the transmitter antenna element;

receiving the reference signal at the receiver antenna elements, the received reference signal at each receiver antenna element having a corresponding receive gain and a corresponding receive phase;

determining the gain adjustments to equalize the respective element gains of each receiver antenna element to the root gain of the manifold root based on the receive gains; and determining the phase adjustments to equalize the respective element phases of each receiver antenna element to the root phase of the manifold root based on the receive phases.

15. The antenna system of claim 14, wherein each gain adjustment comprises a deviation in the gain-code from a nominal gain value and each phase adjustment comprises a deviation in the phase-code form a nominal phase value.

16. The antenna system of claim 14, wherein determining the leveling adjustment for each antenna element comprises:

populating, by the data processing hardware, a gain adjustment matrix with the gain adjustments;

populating, by the data processing hardware, a phase adjustment matrix with the phase adjustments, each adjustment matrix comprising columns and rows, each column corresponding to an antenna element and each row corresponding to a cluster of antenna elements; and for each adjustment matrix:

adding, by the data processing hardware, a shift matrix to the adjustment matrix, the shift matrix aligning adjustments by antenna element;

averaging, by the data processing hardware, the adjustments of each column of the adjustment matrix; and rounding each averaged adjustment to a nearest integer, the nearest integer being the corresponding gain-code or phase-code.

17. The antenna system of claim 16, wherein determining the leveling adjustment for each antenna element further comprises, for each adjustment matrix, minimizing a variance of each column subject to a constraint that relative offsets in a given row are maintained.

18. The antenna system of claim 16, wherein each row of each adjustment matrix corresponds to a least-squares fitting of the corresponding adjustments of the corresponding cluster of the antenna elements.

19. The antenna system of claim 14, wherein the clusters of antenna elements overlap.

20. The antenna system of claim 14, wherein the calibration routine comprises further comprises:

summing the received reference signals of the pair of receiver antenna elements;

receiving the summed signal in a peak detector; and adjusting the element phase and/or the element gain of each receiver antenna element of the pair of receiver antenna elements based on an output of the peak detector.

21. The antenna system of claim 20, wherein the calibration routine comprises further comprises adjusting the element phase of one of the receiver antenna elements of the pair of receiver elements so that the output of the peak detector is maximized.

22. The antenna system of claim 20, wherein the calibration routine comprises further comprises:

shifting the element phase of one of the receiver antenna elements of the pair of receiver elements by 180 degrees; and adjusting the element gain of the other of the receiver antenna elements of the pair of receiver elements so that the output of the peak detector is minimized.

23. The antenna system of claim 14, wherein the reference antenna element is a receiver antenna element and the pairs of calibration antenna elements are pairs of transmitter antenna elements, and wherein the calibration routine comprises:

for each pair of transmitter antenna elements:

transmitting a reference signal from each transmitter antenna element of the pair of transmitter antenna elements;

receiving the reference signals at the receiver antenna element, each received reference signal at the receiver antenna element having a corresponding receive gain and a corresponding receive phase;

determining the gain adjustments to equalize the respective element gains of each transmitter antenna element to the root gain of the manifold root based on the receive gains; and determining the phase adjustments to equalize the respective element phases of each transmitter antenna element to the root phase of the manifold root based on the receive phases.

24. The antenna system of claim 23, wherein the calibration routine comprises further comprises:

summing the received reference signals of the receiver antenna element;

receiving the summed signal in a peak detector; and adjusting the element phase and/or the element gain of each transmitter antenna element of the pair of transmitter antenna elements based on an output of the peak detector.

25. The antenna system of claim 24, wherein the calibration routine comprises further comprises adjusting the element phase of one of the transmitter antenna elements of the pair of transmitter elements so that the output of the peak detector is maximized.

26. The antenna system of claim 24, wherein the calibration routine comprises further comprises:

shifting the element phase of one of the transmitter antenna elements of the pair of transmitter elements by 180 degrees; and adjusting the element gain of the other of the transmitter antenna elements of the pair of transmitter elements so that the output of the peak detector is minimized.

* * * * *